US011755948B2

(12) United States Patent
Kapishnikov et al.

(10) Patent No.: US 11,755,948 B2
(45) Date of Patent: Sep. 12, 2023

(54) ATTRIBUTION AND GENERATION OF SALIENCY VISUALIZATIONS FOR MACHINE-LEARNING MODELS

(71) Applicant: Google LLC, Mountain View, CA (US)

(72) Inventors: Andrei Kapishnikov, Watertown, MA (US); Tolga Bolukbasi, Cambridge, MA (US); Fernanda Bertini Viégas, London (GB); Michael Andrew Terry, Cambridge, MA (US)

(73) Assignee: GOOGLE LLC, Mountain View, CA (US)

( * ) Notice: Subject to any disclaimer, the term of this patent is extended or adjusted under 35 U.S.C. 154(b) by 835 days.

(21) Appl. No.: 16/719,244

(22) Filed: Dec. 18, 2019

(65) Prior Publication Data

US 2021/0192382 A1 Jun. 24, 2021

(51) Int. Cl.
*G06N 20/00* (2019.01)
*G06N 5/04* (2023.01)
*G06N 20/10* (2019.01)

(52) U.S. Cl.
CPC ............... *G06N 20/00* (2019.01); *G06N 5/04* (2013.01); *G06N 20/10* (2019.01)

(58) Field of Classification Search
CPC .......... G06N 20/00; G06N 5/04; G06N 20/10; G06N 3/08
USPC .......................................................... 706/20
See application file for complete search history.

(56) References Cited

U.S. PATENT DOCUMENTS

| | | | | |
|---|---|---|---|---|
| 2003/0215119 A1* | 11/2003 | Uppaluri | ............... | G06T 7/0012 382/128 |
| 2010/0046837 A1* | 2/2010 | Boughorbel | ............. | G06T 7/50 382/173 |
| 2011/0116726 A1* | 5/2011 | Hosaka | ................... | G06T 5/003 382/255 |
| 2013/0156320 A1* | 6/2013 | Fredembach | .......... | G06V 10/56 382/190 |
| 2014/0063275 A1* | 3/2014 | Krahenbuhl | ......... | G06V 10/462 348/208.4 |
| 2014/0079321 A1* | 3/2014 | Huynh-Thu | ......... | G06K 9/0053 382/203 |
| 2015/0003701 A1* | 1/2015 | Klauschen | ............. | G06K 9/629 382/128 |
| 2015/0170005 A1* | 6/2015 | Cohen | ................... | G06F 16/532 382/180 |

(Continued)

*Primary Examiner* — Hicham Skhoun
(74) *Attorney, Agent, or Firm* — Dority & Manning, P.A.

(57) ABSTRACT

Methods, systems, devices, and tangible non-transitory computer readable media for saliency visualization are provided. The disclosed technology can include receiving a data input including a plurality of features. The data input can be segmented into regions. At least one of the regions can include two or more of the features. Attribution scores can be respectively generated for features of the data input. The attribution scores for each feature can be indicative of a respective saliency of such feature. A respective gain value for each region can be determined over one or more iterations based on the respective attribution scores associated with the features included in the region. Further, at each iteration one or more of the regions with the greatest gain values can be added to a saliency mask. Furthermore, at each iteration a saliency visualization can be produced based on the saliency mask.

14 Claims, 13 Drawing Sheets

(7 of 13 Drawing Sheet(s) Filed in Color)

(56) References Cited

U.S. PATENT DOCUMENTS

| | | | | |
|---|---|---|---|---|
| 2017/0364752 | A1* | 12/2017 | Zhou | H04N 13/161 |
| 2019/0251707 | A1* | 8/2019 | Gupta | G06T 9/002 |
| 2020/0134682 | A1* | 4/2020 | Sethi | G06T 7/0002 |
| 2021/0166785 | A1* | 6/2021 | Yip | G06T 11/206 |
| 2021/0169349 | A1* | 6/2021 | Madabhushi | A61B 5/08 |
| 2022/0076130 | A1* | 3/2022 | Nguyen | G06N 3/04 |

* cited by examiner

Algorithm 1 XRAI

1: Given image $I$, model $f$ and attribution method $g$
2: Over-segment $I$ to segments $s \in S$
3: Get attribution map $A = g(f, I)$
4: Let saliency mask $M = \mathbf{0}$, trajectory $T = []$
5: while $S \neq \emptyset$ *and* $area(M) < area(I)$ do
6:     for $s \in S$ do
7:         Compute gain : $g_s = \sum_{i \in s \setminus M} \frac{A_i}{area(s \setminus M)}$
8:     end for
9:     $\hat{s} = \arg\max_s g_s$
10:     $S = S \setminus \hat{s}$
11:     $M = M \cup \hat{s}$
12:     Add $M$ to list $T$
13: end while
14: return $T$

FIG. 10B

ATTRIBUTION AND GENERATION OF SALIENCY VISUALIZATIONS FOR MACHINE-LEARNING MODELS

FIELD

The present disclosure relates generally to systems and methods for generating saliency visualizations, evaluating the validity of saliency techniques, and/or testing the performance of machine-learning models.

BACKGROUND

One example class of techniques for evaluating and understanding machine-learning models is saliency methods. Saliency methods link a prediction or other output generated by a machine-learning model (e.g., a deep neural network (DNN)) to the inputs that most influence that prediction. These capabilities can be useful in a wide range of contexts, including debugging a model's prediction, verifying that the model is not learning spurious correlations, and inspecting the model for issues related to fairness.

Certain saliency methods can be described as image-based saliency methods. A number of image-based saliency methods have been developed over the years. One common approach of determining salient inputs is to rely on the changes in the model output, such as gradients of the output with respect to the input features. For example, the Integrated Gradients (IG) technique determines the salient inputs by gradually varying or "perturbing" the network input from a baseline to the original input and aggregating the gradients. Thus, one set of methods modify the inputs and measure the effect this perturbation has on the output by performing a forward pass through the model with these modified inputs.

While perturbation based-methods allow one to directly estimate the impact of a feature subset on the output, they require multiple queries to the model, making them slow. Moreover, performance degrades as a function of the number of features. Finally, the nonlinear nature of neural networks means that the results are only reliable for the exact subset and modification of the features, making it challenging to obtain a reliable estimate for all perturbations (i.e., there is exponential complexity if one tries every subset of features).

More generally, while existing saliency methods provide useful results, there are opportunities to further improve identification of the most important inputs leading to a model's prediction. Given the potential utility of saliency methods, recent research has begun to critically examine these techniques and has proposed various methods for evaluating them. These evaluation methods provide ways to validate the saliency method's outputs (e.g., to ensure they can be relied upon to explain model behavior), or to empirically measure the methods' outputs, enabling comparison of two or more techniques. For example, "sanity checks" have been developed that help determine whether a saliency method's results meaningfully correspond to a model's learned parameters, while the Sensitivity-n technique empirically measures the quality of a saliency method's output by comparing the change in the output prediction to the sum of attributions.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of attribution. The computer-implemented method can include receiving, by a computing system including one or more processors, a data input that can include a plurality of features. The computer-implemented method can include segmenting, by the computing system, the data input into a plurality of regions. At least one of the plurality of regions can include two or more of the plurality of features. The computer-implemented method can include generating, by the computing system, a plurality of attribution scores respectively for the plurality of features of the data input. The attribution scores for each feature can be indicative of a respective saliency of such feature. For each of one or more iterations, the computer-implemented method can include determining, by the computing system, a respective gain value for each region based at least in part on the respective attribution scores associated with the features included in the region. For each of the one or more iterations, the computer-implemented method can include adding, by the computing system, one or more of the plurality of regions with the greatest gain values to a saliency mask. Furthermore, for each of the one or more iterations, the computer-implemented method can include producing, by the computing system, a saliency visualization based at least in part on the saliency mask.

Another example aspect of the present disclosure is directed to one or more tangible non-transitory computer-readable media storing computer-readable instructions that when executed by one or more processors cause the one or more processors to perform operations. The operations can include determining, over a plurality of iterations, a plurality of features associated with a respective output. The plurality of features can be based at least in part on an input provided to a machine-learned model that generates the respective output. Further, one or more different portions of the plurality of features can be masked at each of the plurality of iterations. The operations can include determining, for each of the plurality of iterations, based at least in part on a saliency technique, a plurality of attributions associated with each of the plurality of features respectively. The plurality of attributions can be associated with an importance of each of the plurality of features in contributing to the output. Furthermore, the operations can include determining that the saliency technique is valid when the plurality of features that cause non-zero change in the respective output are associated with a non-zero attribution.

Another example aspect of the present disclosure is directed to a computing system that can include: one or more processors; and one or more tangible non-transitory computer-readable media storing instructions that when executed by the one or more processors cause the one or more processors to perform operations for each of one or more unnoised data inputs. The operations can include obtaining the unnoised data input. The operations can include performing the saliency technique on the unnoised data input to determine a respective salience score for each of a plurality of portions of the unnoised data input. The operations can include noising the unnoised data input to obtain an initial version of a test data input. For each of a plurality of iterations, the operations can include updating the test data input by inserting into the test data input the portion of the unnoised data input that has the highest salience score and which has not yet been inserted into the test data input. Furthermore, for each of the plurality of iterations, the operations can include evaluating a performance metric of a machine-learned model on the test data input.

Other example aspects of the present disclosure are directed to other methods, systems, devices, apparatuses, or tangible non-transitory computer-readable media for attribution.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Detailed discussion of embodiments directed to one of ordinary skill in the art are set forth in the specification, which makes reference to the appended figures, in which:

FIG. 10B depicts an example algorithm for performing region based saliency according to example embodiments of the present disclosure;

DETAILED DESCRIPTION

Figure 1:
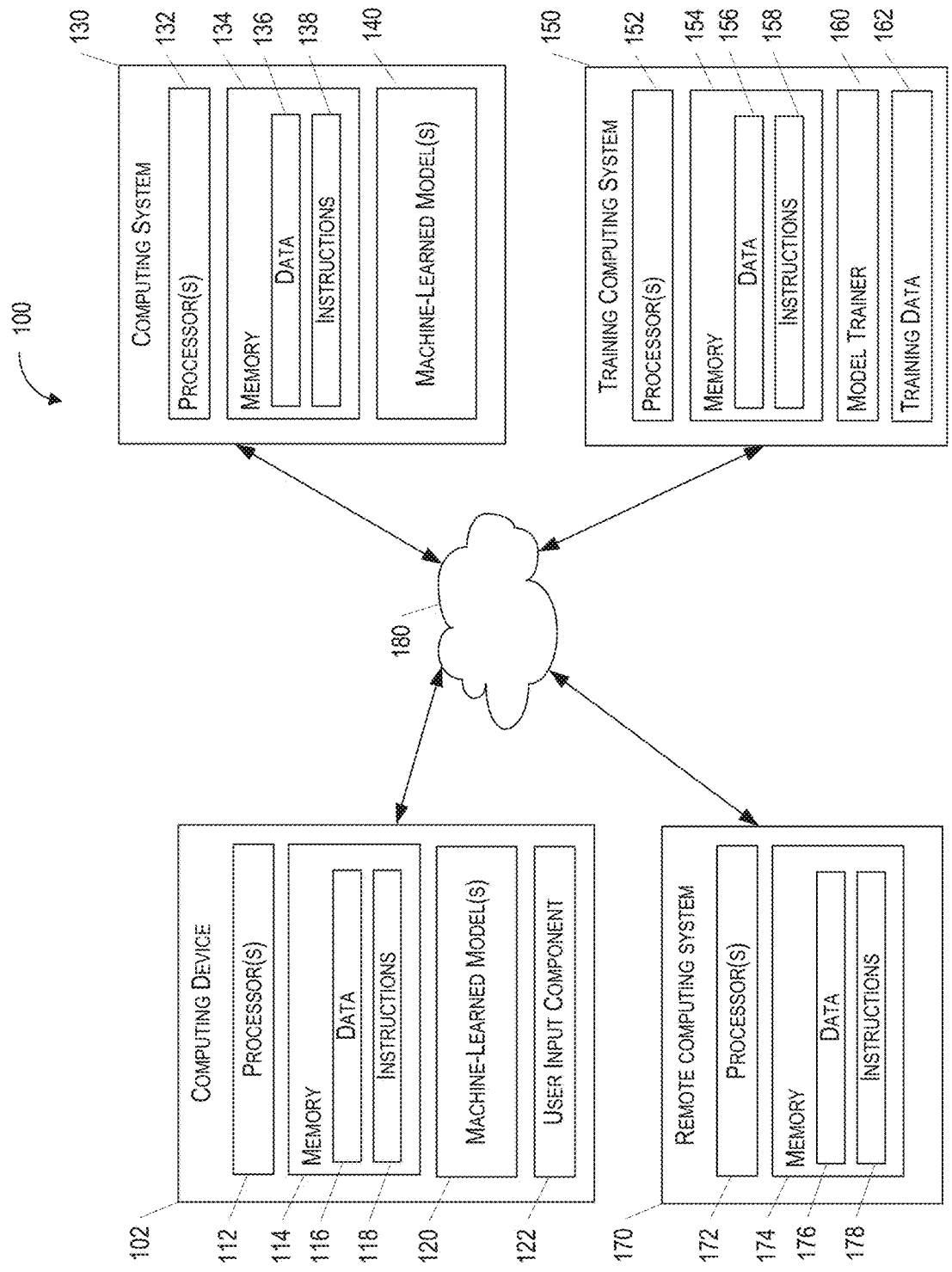
FIG. 1 depicts a diagram of an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an attribution system that can be used for a variety of purposes including the production of saliency visualizations, validation of saliency techniques, and/or evaluation of the performance of saliency techniques performed for machine-learned models on provided test data. For example, the disclosed technology can receive data including information associated with images and produce a saliency visualization in which portions of the image that are determined to be salient are visually highlighted in some fashion. Additionally, the disclosed technology can quickly determine the validity of a saliency technique based on determination of the features of an input (e.g., an image) that result in changes in a respective output are associated with non-zero attribution. Furthermore, the disclosed technology can evaluate the performance of saliency techniques by iteratively testing machine-learned models on test images that have different amounts of noise (e.g., blurring).

Thus, aspects of the present disclosure provide a number of contributions. In one example, the present disclosure provides a novel region-based attribution method that builds and improves upon the existing Integrated Gradients technique. In particular, in some example implementations, the method first over-segments the image, then iteratively tests the importance of each region, coalescing smaller regions into larger segments based on attribution scores. Through examples and empirical results, it has been shown that this strategy yields high quality, tightly bounded saliency regions that outperform existing saliency techniques. The proposed technique can be used with any DNN-based model as long as there is a way to cluster the input features into segments through some similarity metric (e.g. color similarity in images).

As another example contribution, the present disclosure provides an axiom-based sanity check for attribution methods. In particular, a perturbation-based sanity check can be used to test the reliability of an attribution method. In some implementations, the proposed sanity check can require features that cause non-zero change in the output to have at least non-zero attributions. A key insight from this sanity check is that, compared to pixel-level IG attributions, region-level sums of pixel-attributions are more robust.

In addition, the present disclosure provides evaluation methods for empirically assessing the quality of image-based saliency maps. Two example techniques can be referred to as Accuracy Information Curves (AICs) and Softmax Information Curves (SICs), which are both similar in spirit to receiver operating characteristics displays (ROC). These measurement methods are inspired by the bokeh effect in photography, which consists of focusing on objects of interest while keeping the rest of the image blurred. In a similar fashion, an evaluation can start with a completely blurred image and gradually sharpen the image areas that are deemed important by a given saliency method. Gradually sharpening the image areas increases the information content of the image. The saliency methods can be evaluated by measuring the approximate image entropy (e.g., compressed image size) and the model's performance (e.g., model accuracy). Collectively, these metrics can be referred to as Performance Information Curves (PICs).

The disclosed technology can be implemented in a computing system (e.g., an attribution computing system) that is configured to obtain data; perform operations on the data including image segmentation, various saliency techniques, saliency technique validity checks, and evaluation of saliency techniques performed by machine-learned models; and generate output including a saliency visualization.

By way of example, the disclosed technology can be configured to receive data input (e.g., an image of birds in a tree) and segment the image into regions, which may overlap. Attribution scores indicative of the saliency of features in the regions can then be determined. The disclosed technology can then iteratively determine gain values for each region based on the attribution scores in each respective region. For example, the gain values can be positively correlated with the attribution scores such that higher attribution scores result in higher gain values. The regions with the greatest gain values can then be added to a saliency mask, which can be used to produce a saliency visualization. For example, the birds in the image can be masked so that the birds are visible in the image and the remaining portions of the image are not visible (e.g., concealed by a solid color that does not reveal the underlying image).

By way of further example, the disclosed technology can be used to validate a saliency technique by first iteratively determining features of an image based on an input comprising the same image with different portions masked at each iteration. Further, at each iteration, using a saliency technique, attributions associated with the importance of each feature can also be determined. The validity of the saliency technique can then be determined based on whether the features that cause non-zero change in the output are associated with non-zero attribution.

By way of further example, the disclosed technology can be used to evaluate saliency techniques by determining a salience score for different portions of an unnoised input (e.g., an image free from intentionally added noise) based on performance of a saliency technique on the unnoised input. Noise (e.g., blurring) can then be added to the input to create a test data input. The test data input can then be iteratively updated based on insertion into the test data input of the different portions of the unnoised input starting from the portion with the highest salience score and subsequently adding the portion associated with the next highest salience score until all of the portions have been added. Following each iteration, a performance metric of a machine-learned model can be evaluated.

Accordingly, the disclosed technology can improve the effectiveness with which the saliency visualizations are produced, offer rapid validation of saliency techniques, and allow for better evaluation of saliency techniques performed by machine-learned models. The improvement in saliency technique performance can result in more efficient optimization of machine-learned models by determining the inputs that are most salient.

In one embodiment, a computing system can be configured to produce a saliency visualization based at least in part on gain values for attribution scores associated with the importance of features in regions of an input (e.g., an image) with respect to some output that is based on the input. As such, the computing system can receive a data input that can include a plurality of features. The data input can include information associated with an image (e.g., a representation of one or more real-world objects). For example, the data input can include an RGB image. Further, the plurality of features can include a plurality of points. For example, the plurality of features can include pixels or voxels of the image.

The computing system can segment the data input into a plurality of regions (e.g., segments). For example, the image included in the data input can be segmented into a plurality of regions. Further, at least one of the plurality of regions can include two or more of the plurality of features. For example, a data input including an image of an ant on a grassy field can include at least one region with features of both the ant and the grassy field.

In some embodiments, the plurality of regions can include a variety of different shapes. Further, the plurality of regions can include a plurality of overlapping regions. For example, one region can overlap another region such that at least one region includes at least some portion of another region. In some embodiments, each region of the plurality of regions can overlap at least one other region of the plurality of regions.

In some embodiments, segmenting the data input into the plurality of regions can include performing a plurality of iterations of a segmentation technique on the data input respectively with a plurality of different segmentation parameter values. For example, a graph based segmentation technique (e.g., Felzenszwalb's graph-based technique) can be used to segment the data input over a plurality of iterations (e.g., each iteration or round of segmentation will include segmenting the data input using a different set of the plurality of segmentation parameter values).

In some embodiments, the plurality of different segmentation parameter values can be associated with parameters related to the number and/or shape of the regions. For example, the parameter values can set a range for the number of regions and/or the size of the regions.

The computing system can generate a plurality of attribution scores respectively for the plurality of features of the data input. Each of the plurality of attribution scores for each feature can be indicative of a respective saliency of the respective feature. For example, the attribution scores can be positively correlated with the saliency of each respective feature such that a feature with a higher attribution score is more salient than a feature with a lower attribution score. The saliency of a feature can be associated with the importance of and/or significant of any of the plurality of features with the respect to the extent to which a feature in an input contributes to some output. Further, salient features can include those features that belong to a classification that is determined to be salient.

In some embodiments, the plurality of attribution scores can be based at least in part on a saliency technique that can include determination of an integrated gradients density of the plurality of regions. For example, the attribution scores can be determined by accumulating gradients of images based in part on differences between pixels in the regions and a baseline (e.g., a black baseline image) and each region. Further, the integrated gradients formula can be defined as:

$$IG_i(x) = (x_i - x'_i) \int_{\alpha=0}^{1} \frac{\partial F(x' + \alpha \times (x - x'))}{\partial x_i} d\alpha$$

in which $(x_i - x'_i)$ is the difference between the input pixel i and the baseline pixel.

In some embodiments, the plurality of attribution scores can be generated based at least in part on the use of baselines that include at least one white baseline and at least one black baseline. The use of white baseline and a black baseline can reduce the tendency of a baseline integrated gradient to be insensitive to pixels that are close to the baseline image (e.g., dark grey pixels to a black baseline image).

The computing system can perform one or more operations over the course of one or more iterations (e.g., one iteration or a plurality of iterations). Further, for each of the one or more iterations, the computing system can determine a respective gain value for each region. The gain value for each region can be based at least in part on the respective attribution scores associated with the features included in the region. Further, the gain value for each region can be a proportional value that indicates the relationship between the features of a region and their respective importance and/or significance as indicated by their respective attribution scores. In some embodiments, the gain value for each region can be positively correlated with the attribution score associated with the respective region such that greater gain values correspond to greater attribution scores.

In some embodiments, determining the respective gain value for each region can include determining a respective gain in total attributions per area associated with each region. For example, the gain value can be associated with the total number of pixels in a region that contribute to the attributions.

In some embodiments, determining the respective gain value for each region can include determining, for each region, a sum for all features included in each region respectively, but not included in the saliency mask, of the respective attribution value divided by an area of the region not included in the saliency mask.

Further, for each of the one or more iterations, the computing system can add one or more of the plurality of regions with the greatest gain values to a saliency mask. For example, an image of a bird (which is the most salient object in the image) in a tree can have regions that include the bird that have the greatest gain values which are then added to the saliency map.

By way of further example, selection of the regions can be based at least in part on the determination that Integrated Gradients satisfies a Completeness axiom in which the sum of all attributions for an input is equal to the input softmax value minus the baseline softmax value. Given two regions, the region that sums to the more positive value should be more important to a machine-learned model that is configured and/or trained to classify the input. As such, the one or more operations associated with the saliency map can start with an empty mask, after which the regions that yield the maximum gain in the total attributions per area are selectively added. The one or more operations can be performed until the mask encompasses the entire image or until there are no more regions left to add. The trajectory of masks can be associated with the importance ranking of the regions.

Further, for each of the one or more iterations, the computing system can produce a saliency visualization based at least in part on the saliency mask. The saliency visualization can include a graphic representation that includes the one or more portions of the image associated with the input data that are salient and conceals the other portions of the image. For example, the input data can include information associated with an image of a pair of birds in a forest, which can result in a saliency visualization that includes the pair of birds and conceals the remaining portions of the image that do not include the pair of birds (e.g., the forest). Furthermore, in some embodiments, the saliency visualization can use various colors and/or color intensities to represent the saliency of different portions of an image.

In some embodiments, producing the saliency visualization can include producing the saliency visualization based at least in part on an order in which the regions included in the saliency mask were added to the saliency mask. For example, the saliency visualization can gradually show more portions of the saliency mask such that the regions associated with the greatest attribution scores are shown in the saliency visualization before the portions of the saliency mask regions that are associated with the next highest attribution scores.

In some embodiments, producing the saliency visualization can be based at least in part on the order in which the regions included in the saliency mask were added to the saliency mask. Further, producing the saliency visualization can include adding, iteratively and according to the order in which the regions included in the saliency mask were added to the saliency mask, regions to a visualization group until a threshold percentage of the data input is included within the visualization group. For example, the threshold percentage can be three percent (3%) and the regions included in the saliency mask can include the top three percent of regions (the top three percent of regions associated with the highest attribution scores).

Further, producing the saliency visualization based at least in part on the order in which the regions included in the saliency mask were added to the saliency mask can include producing the saliency visualization in which the features included within regions included in the visualization group are visually distinct from a remainder of the data input. For example, the features of a bird's yellow plumage included in a region of an input image can be visually distinct when compared to the features of green and brown leaves in the rest of the image.

In some embodiments, producing the saliency visualization based at least in part on the order in which the regions included in the saliency mask were added to the saliency mask can include providing a heat map visualization that visually indicates the order in which the regions included in the saliency mask were added to the saliency mask. For example, the heat map visualization can associate the regions that are higher in the order with darker colors and the regions that are lower in the order with lighter colors, so that the more salient regions are more visibly prominent in the saliency visualization.

In some embodiments, a computing system can be configured to validate a saliency technique. As such, the computing system can determine a plurality of features (e.g., visual features) associated with a respective output (e.g., facial recognition). Further, the plurality of features can be determined over a plurality of iterations and can be based at least in part on an input provided to a machine-learned model that generates the respective output. For example, the input can include an image that is provided to a machine-learned model that is configured and/or trained to mask the portions (e.g., an individual pixel or a plurality of pixels) of the image that include features associated with a specified class (e.g., a human face).

In some embodiments, determination of the validity of a saliency technique can include use of the function defined as:

$$f(x_1, x_2) = \begin{cases} 1.0 \text{ if } x_1 = 127 \text{ and } x_2 = 127 \\ \text{uniform} \sim [0.0, 0.5] \text{ if } x_1, x_2 \in \text{grid} \end{cases}$$

In the preceding function, $x_1$ and $x_2$ correspond to a pair of input features from two respective input images.

Furthermore, one or more different portions of the plurality of features can be masked at each of the plurality of iterations. For example, an input including an image can mask different portions of the image at each of the plurality of iterations.

The computing system can determine, for each of the plurality of iterations, based at least in part on a saliency technique, a plurality of attributions associated with each of the plurality of features respectively. The plurality of attributions can be associated with an importance of each of the plurality of features in contributing to the output.

The computing system can determine that the saliency technique is valid when the plurality of features that cause non-zero change in the respective output are associated with a non-zero attribution. For example, for a saliency technique to be determined to be valid, the plurality of features will cause a change in the output (e.g., masking a different portion of an image) and are associated with an attribution that is non-zero.

In some embodiments, the computing system can be configured to measure the performance of a saliency technique. As such, the computing system can, for each of one or more unnoised data inputs obtain an unnoised data input. The data input can, for example, include an image to which additional noise has not been added.

The computing system can then perform the saliency technique (e.g., IG (Integrated Gradients) saliency technique) on the unnoised data input to determine a respective salience score for each of a plurality of portions of the unnoised data input.

The computing system can be configured to noise the unnoised data input to obtain an initial version of a test data input. Noising the image can include blurring the image. For example, a Gaussian blur can be applied to the image to create an initial version of the test data input.

For each of a plurality of iterations, the test data input can be updated by inserting into the test data input the portion of the unnoised data input that has the highest salience score, and which has not yet been inserted into the test data input. For example, the test data input can be a blurred image that is updated after each iteration by progressively adding an unblurred portion of the image (e.g., the image before it was blurred) that has the highest salience score of the unblurred portions that have not yet been added to the test data input.

Further, a performance metric of a machine-learned model can be evaluated on the test data input. For example, a machine-learned model can classify the test data input based at least in part on features of the test data input, and the accuracy of the classification can be evaluated using a performance metric.

In some embodiments, evaluating the performance metric can include evaluating a prediction accuracy of the machine-learned model relative to the test data input. For example, a machine-learned model configured and/or trained to predict the salient portions of an image can be evaluated based on a performance metric associated with the accuracy of the prediction.

In some embodiments, evaluating the performance metric can include evaluating a ratio of a first softmax value output by the machine-learned model relative to the test data input for a correct classification versus a second softmax value output by the machine-learned model relative to the initial version of the test data input for the correct classification. Better performance of the saliency technique can be associated with a higher or greater ratio between the first softmax value and the second softmax value.

Further, the computing system can generate a plot of the performance metric of the machine-learned model versus a measure of the information included in the test data input. For example, the plot can be based on a function of the amount of information in the test input data.

Further, the computing system can determine an area under a curve of the plot of the performance metric of the machine-learned model versus the measure of the information included in the test data input. For example, a greater area under a softmax information curve (SIC) can correspond to greater accuracy by a salience technique.

Furthermore, the measurement of the performance of a saliency technique can be based at least in part on a Performance Information Curve (PIC). The PIC can be based at least in part on an aggregation of the performance per information level over all of the samples in a dataset. The area under the PIC can then be used to measure the performance of the saliency technique. The PIC can be embodied in various ways including as an Accuracy Information Curve (AIC) and as a Softmax Information Curve (SIC). In an AIC, the y-axis can represent the accuracy calculated over all of the images for each bin of image information level. In an SIC, the y-axis can represent the proportion of the original label's softmax for the noised data input (e.g., an blurred input image) versus the softmax for the unnoised data input (e.g., the unblurred version of the input image).

In some embodiments, the measure of information included in the test data input can include a normalized estimation of entropy in the test data input and/or a compression size associated with the test data input. Furthermore, the estimation of entropy in the test data input can be used as the measure information content in the test data input from which results can be plotted as a function of the amount of information in the input image. The compressed size of an image can be an indicator of the approximate entropy of an image, since an exact measurement of entropy is not feasible. In some embodiments, a lossless image compression format can be used as part of defining the information to be the proportion of the compressed size of the noised image relative to the unnoised image.

The disclosed technology can be implemented by a variety of systems configured to perform or evaluate saliency techniques. In particular, the disclosed technology can be implemented on a computing system that accesses input data and can be configured to perform one or more operations on the input data to determine salient regions of images included in the input data, validate saliency techniques performed by the computing system or other computing systems, and measure the efficacy of saliency techniques executed by the computing system or other computing systems. Further, a computing system configured to implement the disclosed technology can include specialized hardware and/or software that enable the performance of one or more operations specific to the disclosed technology. Additionally, the computing system can include one or more application specific integrated circuits that are configured to perform operations associated with determining the saliency of regions of an image, validating saliency techniques, and/or measuring the performance of a saliency technique.

The systems, methods, devices, apparatuses, and tangible non-transitory computer-readable media in the disclosed technology can provide a variety of technical effects and benefits including an improvement in the accuracy of determining the saliency of data input, better validation of a saliency technique, and/or improved measurement of the performance of a saliency technique. The disclosed technology can also improve the effectiveness and overall accuracy of saliency techniques that can in turn be used to improve the performance of other computing systems including computing systems that use machine-learning models to perform tasks that benefit from better determination of salient inputs.

The disclosed technology can rapidly validate saliency techniques, thereby resulting in more efficient development and improvement of such techniques. Further, the validation techniques in the disclosed technology can allow for a reduction in the number of operations that need to be performed to validate a saliency technique. The reduction in the number of operations can also result in a reduction in the amount of energy that is used to validate the saliency technique. As such, use of the validation techniques can result in more efficient use of existing energy resources and/or greater performance that does not require greater amounts of energy.

Furthermore, the disclosed technology can result in the development of more effective and efficient machine-learned models that provide more consistent and accurate output. More consistent and accurate machine-learned models can provide significant improvements in applications in which safety is a priority (e.g., self-driving vehicles).

The disclosed technology can allow the user of a computing system to more effectively perform the technical task of generating saliency visualizations, validating saliency techniques, and determining the efficacy of a saliency technique. As a result, users are provided with the specific benefits of greater performance, more efficient use of system resources, and improved safety resulting from improved machine-learned models. Further, any of the specific benefits provided to users can be used to improve the effectiveness of a wide variety of devices and services including devices that use machine-learning systems. Accordingly, the improvements offered by the disclosed technology can result in tangible benefits to a variety of devices and/or systems including mechanical, electronic, and computing systems associated with saliency techniques.

With reference now to FIGS. 1-12, example embodiments of the present disclosure will be discussed in further detail. FIG. 1 depicts a diagram of an example system according to example embodiments of the present disclosure. The system 100 includes a computing device 102, a computing system 130, a training computing system 150, and one or more remote computing systems 170 that are communicatively connected and/or coupled over a network 180.

The computing device 102 can include one or more processors 112 and a memory 114. The one or more processors 112 can include any suitable processing device (e.g., a processor core, a microprocessor, an application specific integrated circuit (ASIC), a field programmable gate array (FPGA), a controller, and/or a microcontroller) and can be one processor or a plurality of processors that are operatively connected. The memory 114 can include one or more non-transitory computer-readable storage mediums, including RAM, NVRAM, ROM, EEPROM, EPROM, flash memory devices, magnetic disks, and combinations thereof. The memory 114 can store data 116 and instructions 118 which are executed by the processor 112 to cause the computing device 102 to perform one or more operations. In some embodiments, the data 116 can include a data input that can include information associated with an image that can include a plurality of pixels. In some embodiments, the computing device 102 can include any of the attributes and/or capabilities of the computing system 130 and can perform one or more operations including any of the operations performed by the computing system 130.

The computing device 102 can be implemented in and/or include any type of computing device, including, for example, a personal computing device (e.g., laptop computing device or desktop computing device), a mobile computing device (e.g., smartphone or tablet), a controller, a wearable computing device (e.g., a smart watch), and/or an embedded computing device.

Further, the computing device 102 can be configured to perform one or more operations including: receiving a data input that can include a plurality of features; segmenting the data input into a plurality of regions; generating a plurality of attribution scores respectively for the plurality of features of the data input; for each of one or more iterations; determining a respective gain value for each region based at least in part on the respective attribution scores associated with the features included in the region; for each of the one or more iterations adding one or more of the plurality of regions with the greatest gain values to a saliency mask; for each of the one or more iterations producing a saliency visualization based at least in part on the saliency mask.

In some embodiments, the computing device 102 can perform one or more operations including: determining, over a plurality of iterations, a plurality of features associated with a respective output, the plurality of features based at least in part on an input provided to a machine-learned model that generates the respective output; masking one or more different portions of the plurality of features at each of the plurality of iterations; determining, for each of the plurality of iterations, based at least in part on a saliency technique, a plurality of attributions associated with each of the plurality of features respectively, the plurality of attributions associated with an importance of each of the plurality of features in contributing to the output; and determining that the saliency technique is valid when the plurality of features that cause non-zero change in the respective output are associated with a non-zero attribution.

In some embodiments, the computing device 102 can perform one or more operations for each of one or more unnoised data inputs including obtaining an unnoised data input; performing a saliency technique on the unnoised data input to determine a respective salience score for each of a plurality of portions of the unnoised data input; noising the unnoised data input to obtain an initial version of a test data input; for each of a plurality of iterations, updating the test data input by inserting into the test data input the portion of the unnoised data input that has the highest salience score and which has not yet been inserted into the test data input; and for each of the plurality of iterations, evaluating a performance metric of a machine-learned model on the test data input.

In some implementations, the computing device 102 can implement and/or include one or more machine-learned models 120. For example, the one or more machine-learned models 120 can include various machine-learned models including neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, and/or other forms of neural networks. Examples of the one or more machine-learned models 120 are discussed with reference to FIGS. 1-12.

In some implementations, the one or more machine-learned models 120 can be received from the computing system 130 (e.g., a server computing system) over network 180, stored in the computing device memory 114, and then used or otherwise implemented by the one or more processors 112. In some implementations, the computing device 102 can implement multiple parallel instances of a single machine-learned model of the one or more machine learned models 120 (e.g., to determine a plurality of features across multiple instances of the machine-learned model 120). More particularly, the one or more machine-learned models 120 can be configured and/or trained to perform any of the operations performed by the computing device 102 and/or the computing system 130. Furthermore, the one or more machine-learned models can be configured and/or trained to perform one or more attribution techniques and/or one or more saliency techniques.

Additionally, or alternatively, one or more machine-learned models 140 can be included in or otherwise stored and implemented by the computing system 130 that communicates with the computing device 102, for example, according to a client-server relationship. For example, the machine-learned models 140 can be implemented by the computing system 130 as a portion of a web service (e.g., an attribution service). Thus, one or more machine-learned models 120 can be stored and implemented at the computing device 102 and/or one or more machine-learned models 140 can be stored and implemented at the computing system 130.

The computing device 102 can also include one or more of the user input component 122 that can receive user input. For example, the user input component 122 can be a touch-sensitive component (e.g., a touch-sensitive display screen or a touch pad) that is sensitive to the touch of a user input (e.g., a finger and/or a stylus). The touch-sensitive component can serve to implement a virtual keyboard. Other example user input components include a microphone, a mechanical keyboard, an electromechanical keyboard, and/or other means by which a user can provide user input.

The computing system 130 can include one or more processors 132 and a memory 134. The one or more processors 132 can include any suitable processing device (e.g., a processor core, a microprocessor, an ASIC, a FPGA, a controller, and/or a microcontroller) and can include one processor or a plurality of processors that are operatively connected. The memory 134 can include one or more non-transitory computer-readable storage mediums, including RAM, ROM, EEPROM, EPROM, flash memory devices, magnetic disks, and combinations thereof. The memory 134 can store data 136 and instructions 138 which are executed by the processor 132 to cause the computing system 130 to perform operations. In some embodiments, the data 136 can include a data input that can include information associated with an image that can include a plurality of pixels. In some embodiments, the computing system 130 can include any of the attributes and/or capabilities of the computing device 102 and can perform one or more operations including any of the operations performed by the computing device 102.

Furthermore, one or more portions of the computing system 130 can be implemented as part of a cloud computing system, a cloud computing infrastructure, and/or a cloud computing service. Any of the operations performed by the computing system 130 can be distributed over a plurality of computing devices that can be remotely located from one another (e.g., different groups of computing devices located in different cities) and accessed via a network (e.g., the network 180) which can include the Internet. Further, data and/or information associated with the operations performed by the cloud portion of the computing system 130 can be provided to one or more other computing devices and/or computing systems including the computing device 102, the training computing system 150, and/or the remote computing systems 170.

In some embodiments, the computing system 130 can be configured to perform the operations of a server computing device including sending and/or receiving data including data input to and/or from one or more computing devices and/or computing systems including the computing device 102, the training computing system 150, and/or the remote computing system 170. In some embodiments, the computing system 130 can include any of the attributes and/or capabilities of the computing device 102 and can perform one or more operations including any of the operations performed by the computing device 102.

Further, the computing system 130 can be implemented in and/or include any type of computing system, including, for example, an attribution computing system (e.g., a computing system configured to perform any operations described herein including generating saliency visualizations, validating saliency techniques, and/or testing the performance of machine-learned models), a personal computing device (e.g., laptop computing device or desktop computing device), a mobile computing device (e.g., smartphone or tablet), a server computing system (e.g., a computing system configured to provide data including data input), and/or a controller.

In some implementations, the computing system 130 includes and/or is otherwise implemented by one or more server computing devices. In instances in which the computing system 130 includes a plurality of server computing devices, such server computing devices can operate according to sequential computing architectures, parallel computing architectures, or some combination thereof.

As described above, the computing system 130 can store or otherwise include the one or more machine-learned models 140. For example, the one or more machine-learned models 140 can include various machine-learned models. Example machine-learned models include neural networks or other multi-layer non-linear models. Example neural networks include feed forward neural networks, deep neural networks, recurrent neural networks, and convolutional neural networks. Examples of the one or more machine-learned models 140 are discussed with reference to FIGS. 1-12.

The computing device 102 and/or the computing system 130 can train the one or more machine-learned models 120 and/or 140 via interaction with the training computing system 150 that is communicatively connected and/or coupled over the network 180. The training computing system 150 can be separate from the computing system 130 or can be a portion of the computing system 130.

The training computing system 150 includes one or more processors 152 and a memory 154. The one or more processors 152 can be any suitable processing device (e.g., a processor core, a microprocessor, an ASIC, a FPGA, a controller, and/or a microcontroller) and can be one processor or a plurality of processors that are operatively connected. The memory 154 can include one or more non-transitory computer-readable storage mediums, including RAM, ROM, EEPROM, EPROM, flash memory devices, magnetic disks, and combinations thereof. The memory 154 can store data 156 and instructions 158 which are executed by the processor 152 to cause the training computing system 150 to perform operations. In some embodiments, the data 156 can include a data input that can include information associated with an image that can include a plurality of points (e.g., pixels). In some implementations, the training computing system 150 includes or is otherwise implemented by one or more server computing devices.

The training computing system 150 can include a model trainer 160 that trains the one or more machine-learned models 120 and/or the one or more machine-learned models 140 respectively stored at the computing device 102 and/or the computing system 130 using various training or learning techniques, including, for example, backwards propagation of errors. In some implementations, performing backwards propagation of errors can include performing truncated backpropagation through time. The model trainer 160 can perform a number of generalization techniques (e.g., weight decays and/or dropouts) to improve the generalization capability of the models being trained.

In particular, the model trainer 160 can train the one or more machine-learned models 120 and/or the one or more machine-learned models 140 based on a set of training data 162. The training data 162 can include, for example, any image data which can include information associated with depictions of one or more objects. For example, the training data can include the a plurality of training images including images that have been noised to obscure certain features of the respective images. The one or more machine-learned models 120 and/or the one or more machine-learned models 140 can be configured and/or trained to perform any of the one or more operations performed by the computing device 102 and/or the computing system 130. For example, the one or more machine-learned models 120 can be configured and/or trained to perform various operations including determining one or more features of an image and/or determining the saliency of various regions of an image.

In some implementations, if the user has provided consent, the training examples can be provided by the computing device 102. Thus, in such implementations, the one or more machine-learned models 120 provided to the computing device 102 can be trained by the training computing system 150 based at least in part on user-specific data received from the computing device 102 including tagged images in which salient features (e.g., faces) have been identified and/or labelled.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium including RAM hard disk or optical or magnetic media.

Each of the one or more remote computing systems 170 can include one or more processors 172 and a memory 174. The one or more processors 172 can include any suitable processing device (e.g., a processor core, a microprocessor, an ASIC, a FPGA, a controller, and/or a microcontroller) and can include one processor or a plurality of processors that are operatively connected. The memory 174 can include one or more non-transitory computer-readable storage mediums, including RAM, ROM, EEPROM, EPROM, flash memory devices, magnetic disks, and combinations thereof. The memory 174 can store data 176 and instructions 178 which are executed by the processor 172 to cause the remote computing system 170 to perform operations.

In some implementations, the one or more remote computing systems 170 can include or are otherwise implemented by one or more computing devices. In instances in which the one or more remote computing systems 170 includes plural computing devices, such computing devices can operate according to sequential computing architectures, parallel computing architectures, and/or some combination thereof. Furthermore, the one or more remote computing systems 170 can be used to collect, generate, send, and or receive one or more signals and/or data including data input. The one or more remote computing systems 170 can include a smart phone device that a user of the smart phone device can use to access data generated by the computing system 130.

The network 180 can include any type of communications network, including a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the computing device 102 and/or the computing system 130 can include the model trainer 160 and the training data 162. In such implementations, the one or more machine-learned models 120 can be both trained and used locally at the computing device 102 and/or the computing system 130. In some such implementations, the computing device 102 and/or the computing system 130 can implement the model trainer 160 to personalize the one or more machine-learned models 120 based on user-specific data.

Figure 2:
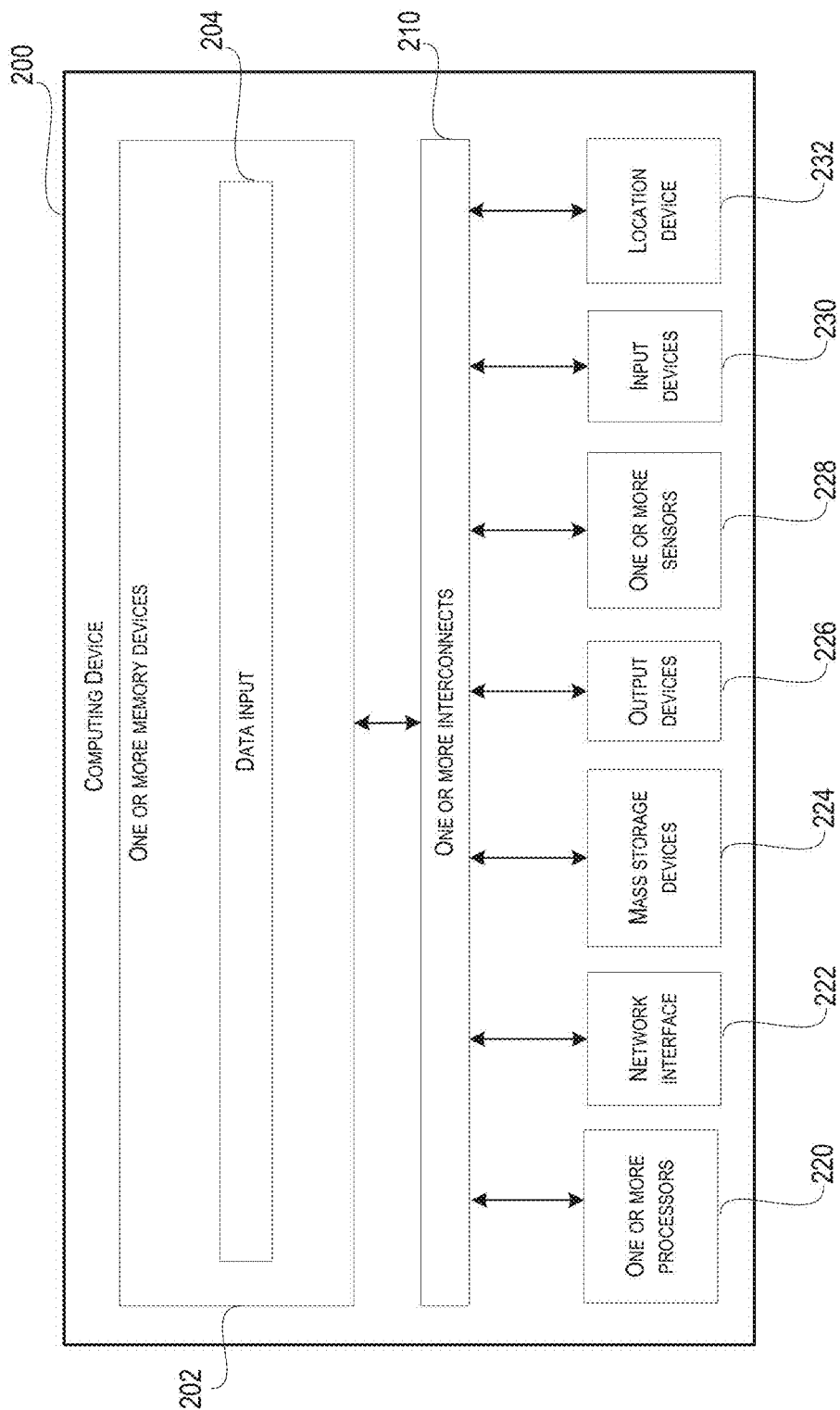
FIG. 2 depicts a diagram of an example device according to example embodiments of the present disclosure.

FIG. 2 depicts a diagram of an example device according to example embodiments of the present disclosure. A computing device 200 can include one or more attributes and/or capabilities of the computing device 102, the computing system 130, the training computing system 150, and/or the one or more remote computing systems 170. Furthermore, the computing device 200 can perform one or more actions and/or operations including the one or more actions and/or operations performed by the computing device 102, the computing system 130, the training computing system 150, and/or the one or more remote computing systems 170, which are depicted in FIG. 1.

As shown in FIG. 2, the computing device 200 can include one or more memory devices 202, data input 204, one or more interconnects 210, one or more processors 220, a network interface 222, one or more mass storage devices 224, one or more output devices 226, one or more sensors 228, one or more input devices 230, and/or the location device 232.

The one or more memory devices 202 can store information and/or data (e.g., the data input 204). Further, the one or more memory devices 202 can include one or more non-transitory computer-readable storage mediums, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform operations.

The data input 204 can include one or more portions of data (e.g., the data 116, the data 136, the data 156, and/or the data 176 which are depicted in FIG. 1) and/or instructions (e.g., the instructions 118, the instructions 138, the instructions 158, and/or the instructions 178 which are depicted in FIG. 1) that are stored in the memory 114, the memory 134, the memory 154, and/or the memory 174 respectively. Furthermore, the data input 204 can include information associated one or more images that include a plurality of pixels. In some embodiments, the data input 204 can be received from one or more computing systems (e.g., the computing system 130).

The one or more interconnects 210 can include one or more interconnects or buses that can be used to send and/or receive one or more signals (e.g., electronic signals) and/or data (e.g., the data input 204) between components of the computing device 200, including the one or more memory devices 202, the one or more processors 220, the network interface 222, the one or more mass storage devices 224, the one or more output devices 226, the one or more sensors 228 (e.g., sensor array), and/or the one or more input devices 230. The one or more interconnects 210 can be arranged or configured in different ways including as parallel or serial connections. Further the one or more interconnects 210 can include one or more internal buses to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the data input 204. The one or more processors 220 can include single or multiple core devices including a microprocessor, microcontroller, integrated circuit, and/or logic device.

The network interface 222 can support network communications. For example, the network interface 222 can support communication via networks including a local area network and/or a wide area network (e.g., the Internet). The one or more mass storage devices 224 (e.g., a hard disk drive and/or a solid state drive) can be used to store data including the data input 204. The one or more output devices 226 can include one or more display devices (e.g., LCD display, OLED display, and/or CRT display), one or more light sources (e.g., LEDs), one or more loud speakers, and/or one or more haptic output devices.

The one or more input devices 230 can include one or more keyboards, one or more touch sensitive devices (e.g., a touch screen display), one or more buttons (e.g., ON/OFF buttons and/or YES/NO buttons), one or more microphones, and/or one or more cameras.

The one or more memory devices 202 and the one or more mass storage devices 224 are illustrated separately, however, the one or more memory devices 202 and the one or more mass storage devices 224 can be regions within the same memory module. The computing device 200 can include one or more additional processors, memory devices, network interfaces, which may be provided separately or on a same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. The one or more memory devices 202 can be used to operate various applications including a mobile operating system developed specifically for mobile devices. As such, the one or more memory devices 202 can store instructions that allow the software applications to access data including wireless network parameters (e.g., identity of the wireless network, quality of service), and invoke various services including telephony, location determination (e.g., via global positioning system (GPS) or WLAN), and/or wireless network data call origination services. In other embodiments, the one or more memory devices 202 can be used to operate or execute a general-purpose operating system that operates on both mobile and stationary devices, such as smartphones and desktop computers, for example.

The software applications that can be operated or executed by the computing device 200 can include applications associate with the system 100 shown in FIG. 1. Further, the software applications that can be operated and/or executed by the computing device 200 can include native applications and/or web-based applications.

The location device 232 can include one or more devices and/or circuitry for determining the position of the computing device 200. For example, the location device 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

Figure 3:
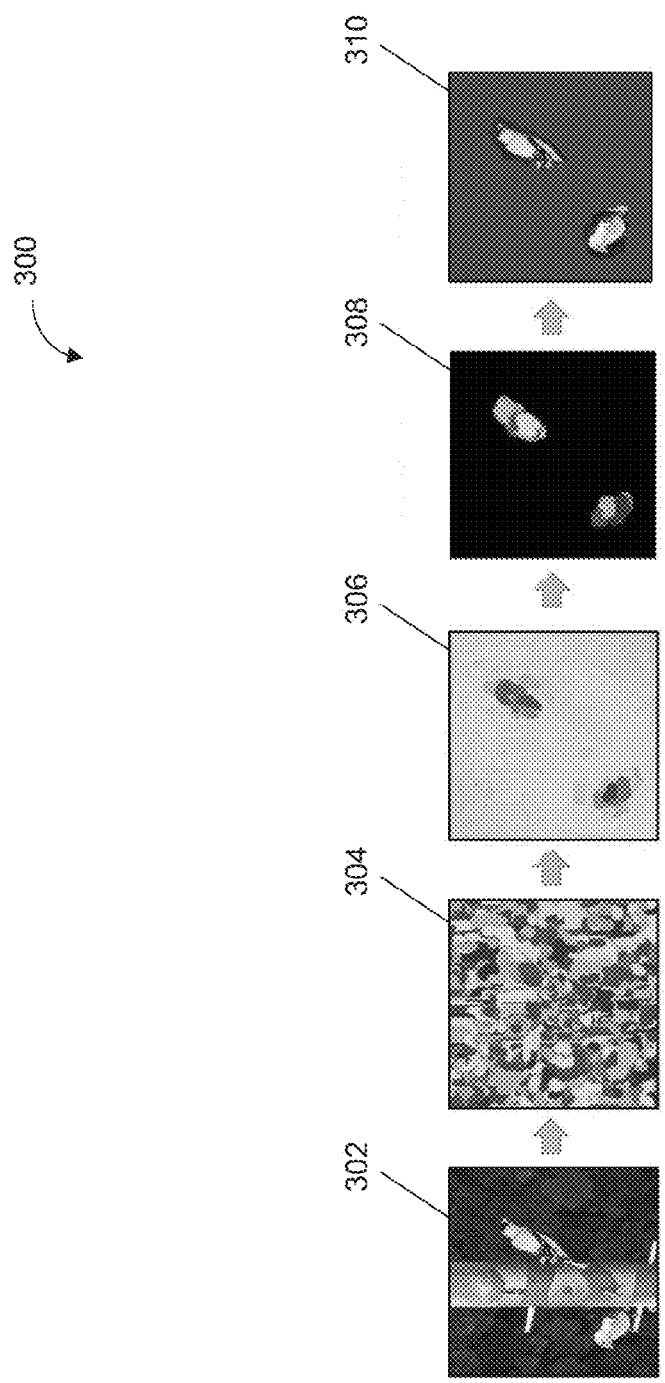
FIG. 3 depicts an example of a saliency technique according to example embodiments of the present disclosure.

FIG. 3 depicts an example of a saliency technique according to example embodiments of the present disclosure. Any operations and/or actions performed as part of the technique 300 can be performed by a computing device and/or computing system that includes one or more attributes and/or capabilities of the computing device 102, the computing system 130, the training computing system 150, and/or the one or more remote computing systems 170. As shown in FIG. 3, the technique 300 includes an image 302, segmentation operations 304, segment relevance heatmap 306, a segment selection 308, and a visualization 310.

The image 302 can be an input image on which one or more operations associated with a saliency technique are performed. Further, the image 302 can include a plurality of points (e.g., a plurality of pixels). The image 302 includes a depiction of two birds (e.g., goldfinches).

The segmentation operations 304 can include segmentation of the image 302 into a plurality of segments (e.g., a plurality of regions) which can be over-segmented such that the plurality of segments overlap one another. In this example, the plurality of segments can be distinguished from one another by different colors. In some embodiments, since the plurality of segments can overlap, the total area of the plurality of segments can be greater than the area of the image 302.

The segment saliency heatmap 306 can indicate which of the plurality of segments in the image 302 are the most salient (e.g., are the most significant and/or important portions of the image 302). In this example, the darker and redder portions of the plurality of segments indicate the more salient regions and the bluer portions of the plurality of segments indicate the less salient regions. As shown, the segment saliency heatmap 306 has accurately identified the salient (e.g., bird) portions of the image 302.

The segment selection 308 can be associated with an area threshold that includes the portion of the plurality of segments that are shown. The area threshold can include a threshold area of the image 302 that shows a portion of the most salient plurality of segments. In some embodiments, the segment selection 308 can be associated with an adjustable area threshold. In this example, the segment selection 308 includes an area threshold of ten percent (10%) in which the most salient ten percent (10%) portion of the image 302 is shown.

The visualization 310 can use the segment selection to generate a saliency mask that covers the remaining portions of the image 302 (ninety percent (90%)) that are not associated with the segment selection 308.

Figure 4:
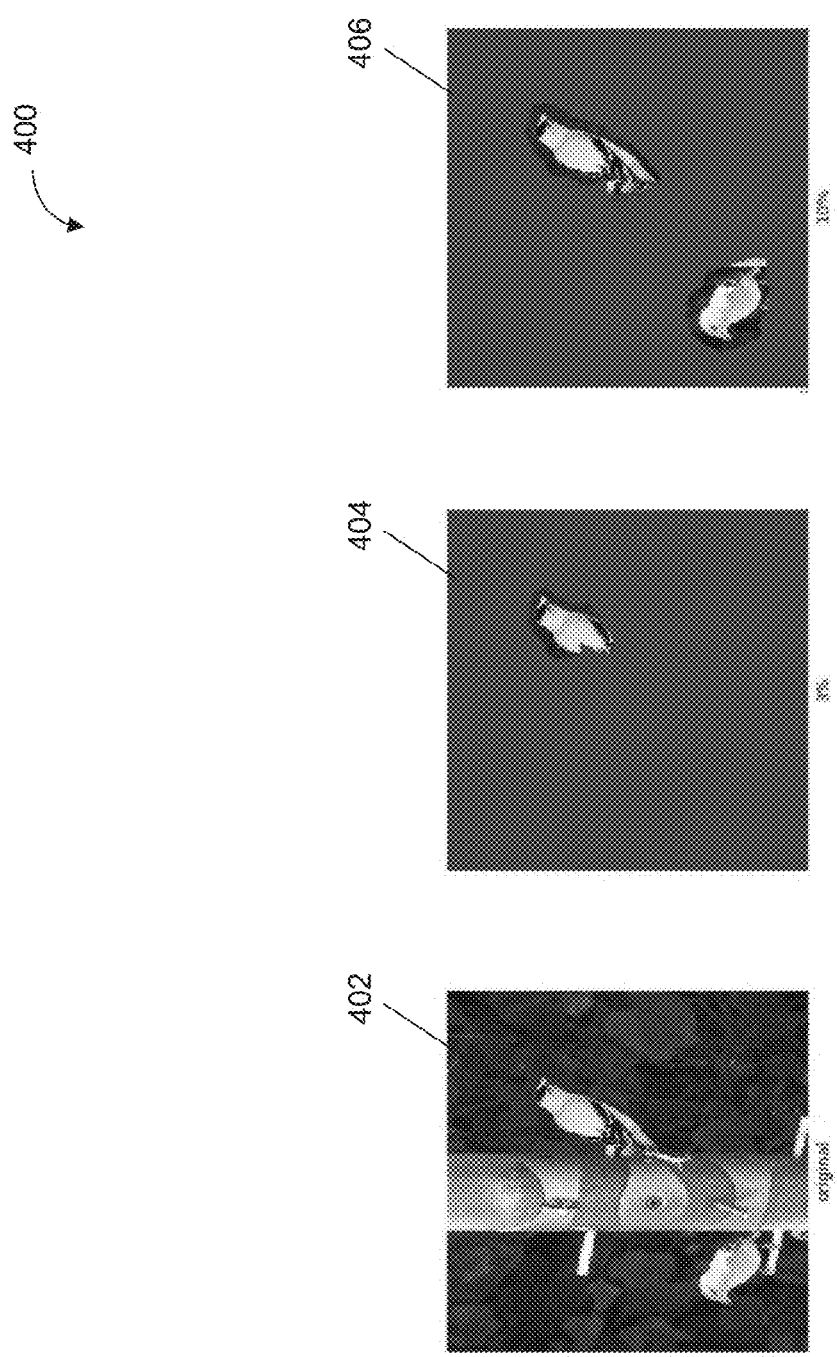
FIG. 4 depicts an example of generating saliency visualizations according to example embodiments of the present disclosure.

FIG. 4 depicts an example of generating saliency visualizations according to example embodiments of the present disclosure. Any operations and/or actions performed as part of the technique 400 can be performed by a computing device and/or computing system that includes one or more attributes and/or capabilities of the computing device 102, the computing system 130, the training computing system 150, and/or the one or more remote computing systems 170. As shown in FIG. 4, the technique 400 includes an image 402, a first saliency mask 404, and a second saliency mask 406.

The technique 400 illustrates different saliency area thresholds that are used on the image 402 which includes a depiction of two birds that are the most salient objects in the image 402. In particular, the image 402 depicts two birds (goldfinches) located in the lower left quadrant and the upper right quadrant of the image 402 respectively. The technique 400 can include a saliency technique that incrementally grows attribution regions associated with the image 402. Further, the technique 400 can show how salient regions of the image 402 (e.g., the regions with the birds) are revealed based at least in part on the application of a saliency area threshold to the image 402. In this example, the first saliency mask 404 shows the application of a saliency area threshold of three percent (3%) in which the top three percent (3%) of the most salient portions of the image 402 are shown. After application of the first saliency mask 404, the bird in the upper right quadrant of the image 402 can be classified (e.g., identified by a machine-learned model configured and/or trained to perform classification operations). Further, the second saliency mask 404 shows the application of a saliency area threshold of ten percent (10%) in which the top ten percent (10%) of the most salient portions of the image 402 are shown. After application of the second saliency mask 406, both the bird in the lower left quadrant of the image 402 and the bird in the upper right quadrant of the image 402 can be accurately classified.

Figure 5:
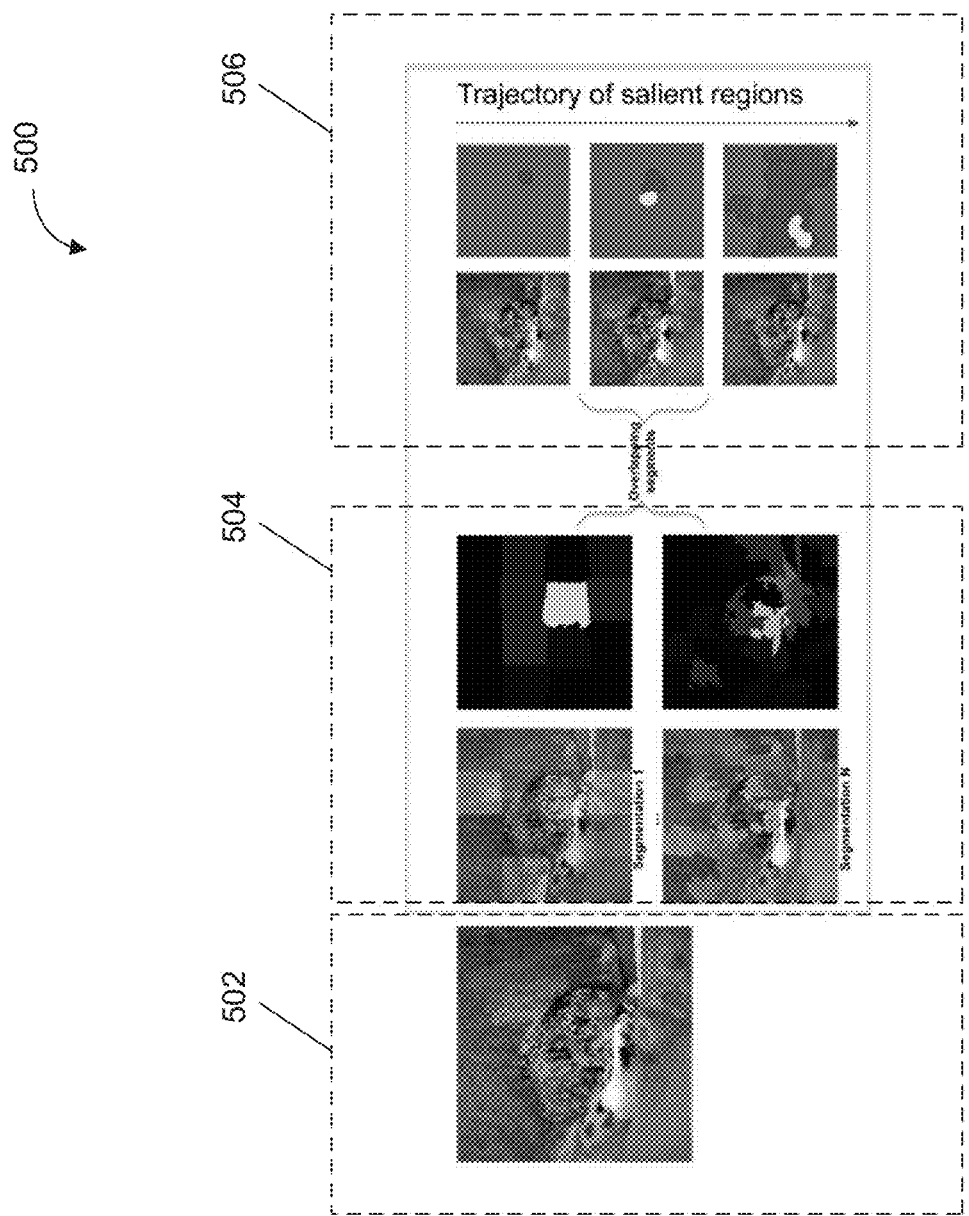
FIG. 5 depicts an example of a saliency technique according to example embodiments of the present disclosure.

FIG. 5 depicts an example of a saliency technique according to example embodiments of the present disclosure. Any operations and/or actions performed as part of the technique 500 can be performed by a computing device and/or computing system that includes one or more attributes and/or capabilities of the computing device 102, the computing system 130, the training computing system 150, and/or the one or more remote computing systems 170. As shown in FIG. 5, the technique 500 includes an input image 502, segmentation operations 504, and a trajectory of salient segments 506.

As shown, the input image 502 (an image of a leopard) can be provided as an input for the segmentation technique 500. The segmentation operations 504 of the segmentation technique 500 can include segmentation of the image 502 into a plurality of segments (e.g., a plurality of regions). The operations 504 can include over-segmentation of the input image 502 into a plurality of overlapping segments that can be various shapes and/or sizes. Further, the plurality of segments can be gradually added (to a segmented image associated with the input image 502) based at least in part on their respective integrated gradients density.

The trajectory of salient segments 506 shows that the ranking of the salient segments can be determined based at least in part on the order in which each of the segments is added. As shown in FIG. 5, the face of the leopard was reconstructed first, followed by the body of the leopard, and then remaining portions of the image 502.

Figure 6:
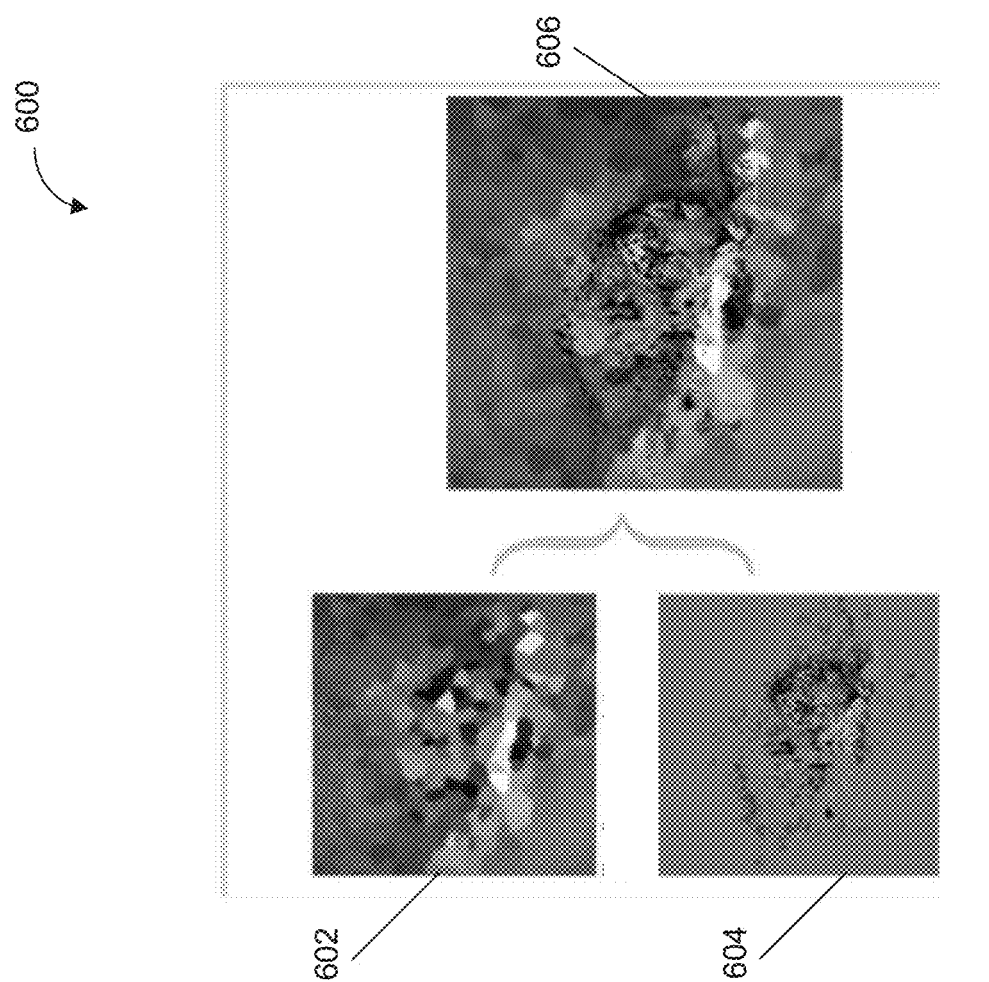
FIG. 6 depicts an example of a performance measurement technique according to example embodiments of the present disclosure.

FIG. 6 depicts an example of a performance measurement technique according to example embodiments of the present disclosure. Any operations and/or actions performed as part of the technique 600 can be performed by a computing device and/or computing system that includes one or more attributes and/or capabilities of the computing device 102, the computing system 130, the training computing system 150, and/or the one or more remote computing systems 170. As shown in FIG. 6, the technique 600 includes a defocused image 602, a salient region mask 604, and a test image 606.

The technique 600 can include a technique for evaluation of the performance of a machine-learned model (e.g., a classifier) that is configured and/or trained to classify an image (e.g., determine the class of an object depicted in an image, for example, whether an image includes a depiction of a leopard). In this example, the defocused image 602 can be an unnoised data input that is an image that has not been noised and/or blurred. As shown in FIG. 6, the defocused image is a defocused image of a leopard. Further, the salient region mask 604 can include the output of a saliency technique performed on the defocused image 602. The combination of the defocused image 602 and the salient region mask 604 can result in the test image 606 (e.g., a test data input). The test image 606 can be provided as an input to a machine-learned model in order to determine the performance of the machine-learned model. Further, the performance of the machine-learned model can be determined through use of a performance metric.

In some embodiments, performance of the technique 600 can include performing one or more operations starting with the defocused image 602 and adding back the pixels the saliency technique has determined to be important, determining the entropy of the resulting image, and performing classification of the resulting image. The results associated with the performance of the machine-learned model (e.g., the accuracy of the classification generated by the machine-learned model) can then be mapped as a function of the determined entropy (e.g., information level), for each input image. The resulting plots (e.g., Performance Information Curves (PICs)) can allow for easier comparison of the performance of various saliency techniques.

Further, the gradual reintroduction of unnoised portions of an image (unblurred content from an unblurred image) and monitoring of the outputs generated by the machine-learned model can provide the benefit of revealing the most significant and/or important portions of the image for the machine-learned model's prediction, the next-to-most important portions, and so on and so forth. By way of further example, an image depicting a husky (a Siberian husky dog) in the foreground and snow in the background can be effectively analyzed using the technique 600. Even when the husky is determined to be the most important region and is correctly classified, the technique 600 can also provide the valuable information that the background snow is also an important region.

Figure 7:
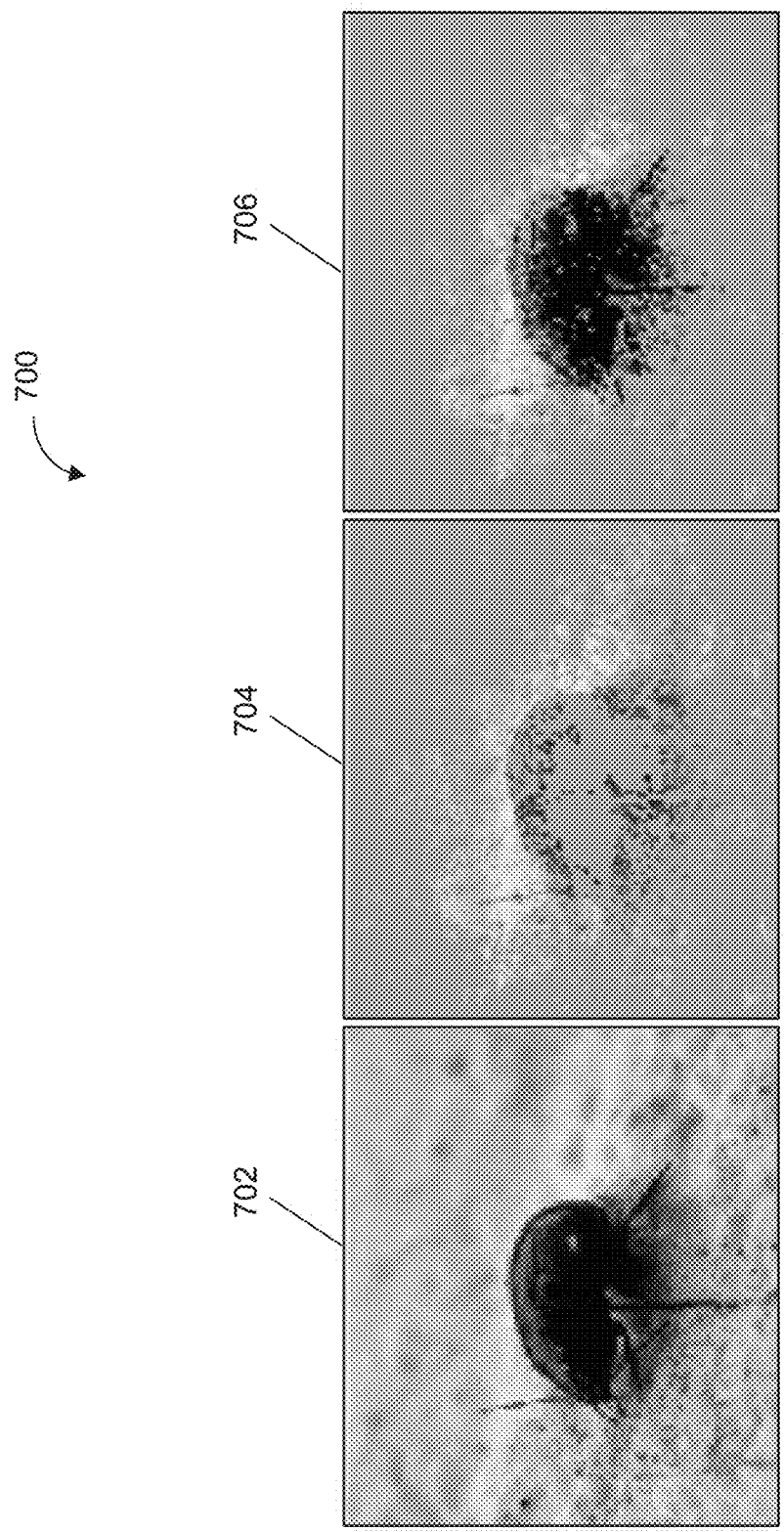
FIG. 7 depicts an example of a saliency technique according to example embodiments of the present disclosure.

FIG. 7 depicts an example of a saliency technique according to example embodiments of the present disclosure. Any operations and/or actions performed as part of the technique can be performed by a computing device and/or computing system that includes one or more attributes and/or capabilities of the computing device 102, the computing system 130, the training computing system 150, and/or the one or more remote computing systems 170. As shown in FIG. 7, the images 700 include an image 702, an image 704, and an image 706.

The images 700 include the image 702, the image 704, and the image 706. As shown, the image 702 is an input image (of a beetle with black coloration) that can provided as an input on which an Integrated Gradients ("IG") technique can be performed.

The image 704 and the image 706 can be based at least in part on performance of the IG technique on the image 702. The image 704 depicts the result of performance of the IG technique on the image 702 in which the baseline for the IG technique is black. As shown in FIG. 7, use of a black baseline has resulted in a failure to attribute the center of the black colored beetle and has attributed bright background portions of the image 702 instead.

The image 706 is the result of performance of a saliency technique (e.g., the saliency techniques disclosed herein) on the image 702 in which black and white baselines are used. The use of a black and white baselines has resulted in the attribution of both bright and dark pixels, which was not the case in the image 704.

Figure 8:
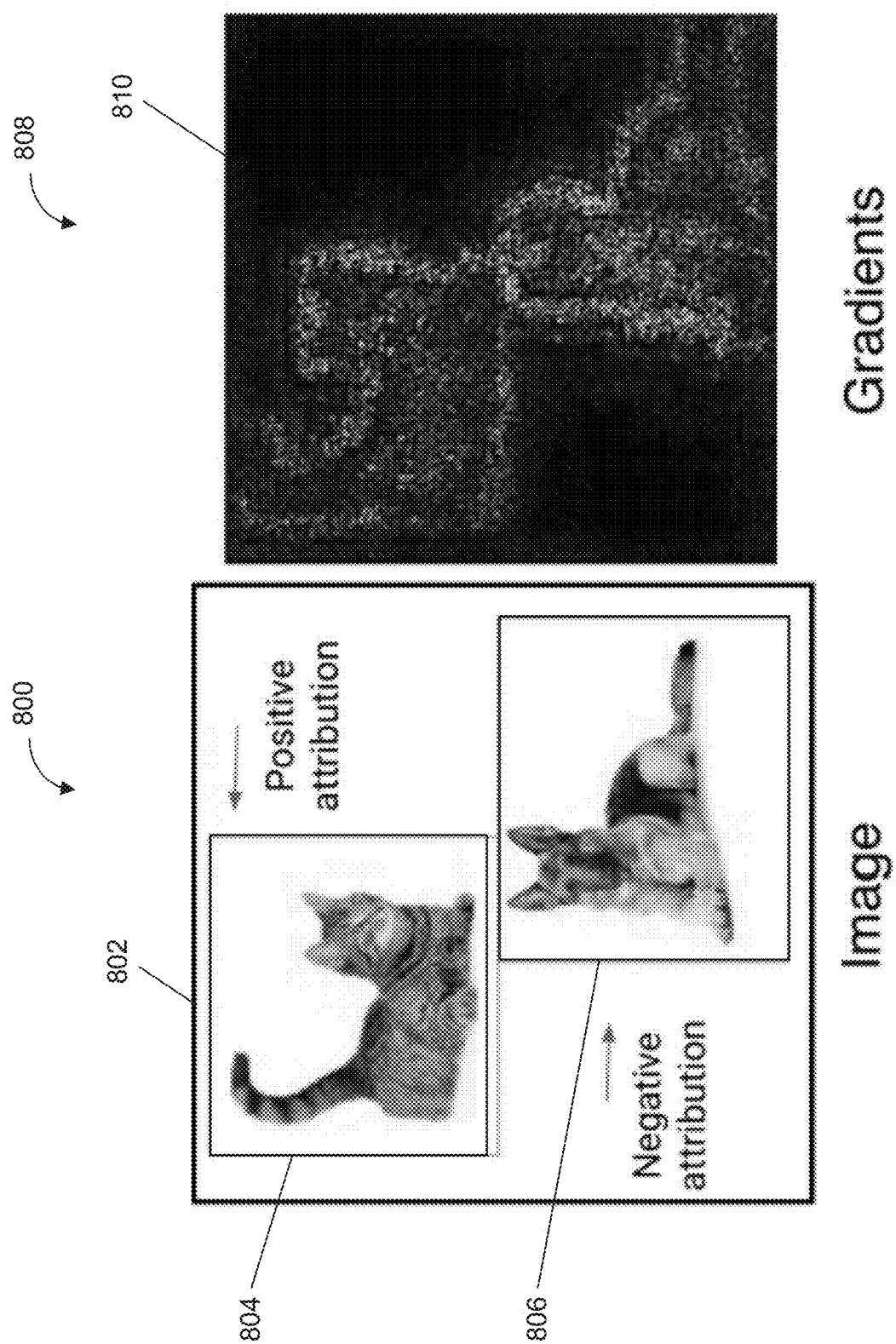
FIG. 8 depicts an example of a saliency technique according to example embodiments of the present disclosure.

FIG. 8 depicts an example of a saliency technique according to example embodiments of the present disclosure. Any operations and/or actions performed as part of the technique 800 can be performed by a computing device and/or computing system that includes one or more attributes and/or capabilities of the computing device 102, the computing system 130, the training computing system 150, and/or the one or more remote computing systems 170. FIG. 8 includes a technique 800, an image 802, a cat attribution 804, a dog attribution 806, a technique 808, and gradients 810.

The image 802 is an image depicting a cat object associated with the cat attribution 804 (in a respective bounding box) and a dog object associated with the dog attribution 806 (in a respective bounding box). In this example, the cat attribution 804 and the dog attribution 806 have been determined using the technique 800 (a saliency technique) that analyzed the image 802 and determined that the image 802 included an object class associated with a cat object. Although there are negative and positive pixel level attributions resulting from performance of the technique 800, the overall sum of Integrated Gradients attributions within the bounding box depicting the cat object is positive. The overall sum of Integrated Gradients attributions within the bounding box depicting the dog object is negative. Thus, the technique 800 determines that the bounding box 806 is not the reason why the model classified the image 802 as a cat object.

In contrast with the technique 800, the technique 808 (Integrated Gradients) produces the attributions of 810 that were calculated for the image with respect to the cat class. Regardless of the selected class, the gradients 810 can operate as an edge detector and (incorrectly) attribute both the cat object and the dog object. As such, the technique 800, which is further described herein can more effectively determine truly salient regions of the image 802.

Furthermore, the technique 800 can determine regions of an image that are relevant to the predicted class and discard irrelevant regions. The technique 800 leverages the observation that the sum of all attributions is equal to the difference between the model output at the input x and the baseline x'. As such, the regions that actually contribute to the class prediction should have high positive attribution; regions that are unrelated to the class prediction should have near-zero attribution; and regions that contain competing classes should have negative attribution. Referring to the image 802, if the image 802 was originally empty (a blank image) and the region with the cat object was added first, the output of the machine-learned model would change from near 0.0 to 1.0. As a result, the delta of the attributions will be positive. The introduction of the region with the dog object (after adding the cat object) can cause the output of the machine-learned model to drop from 1.0 to 0.6, thus changing the attributions by 0.4. Likewise, if changing the background does not change the model prediction, the attribution of the background can be near-zero.

Figure 9:
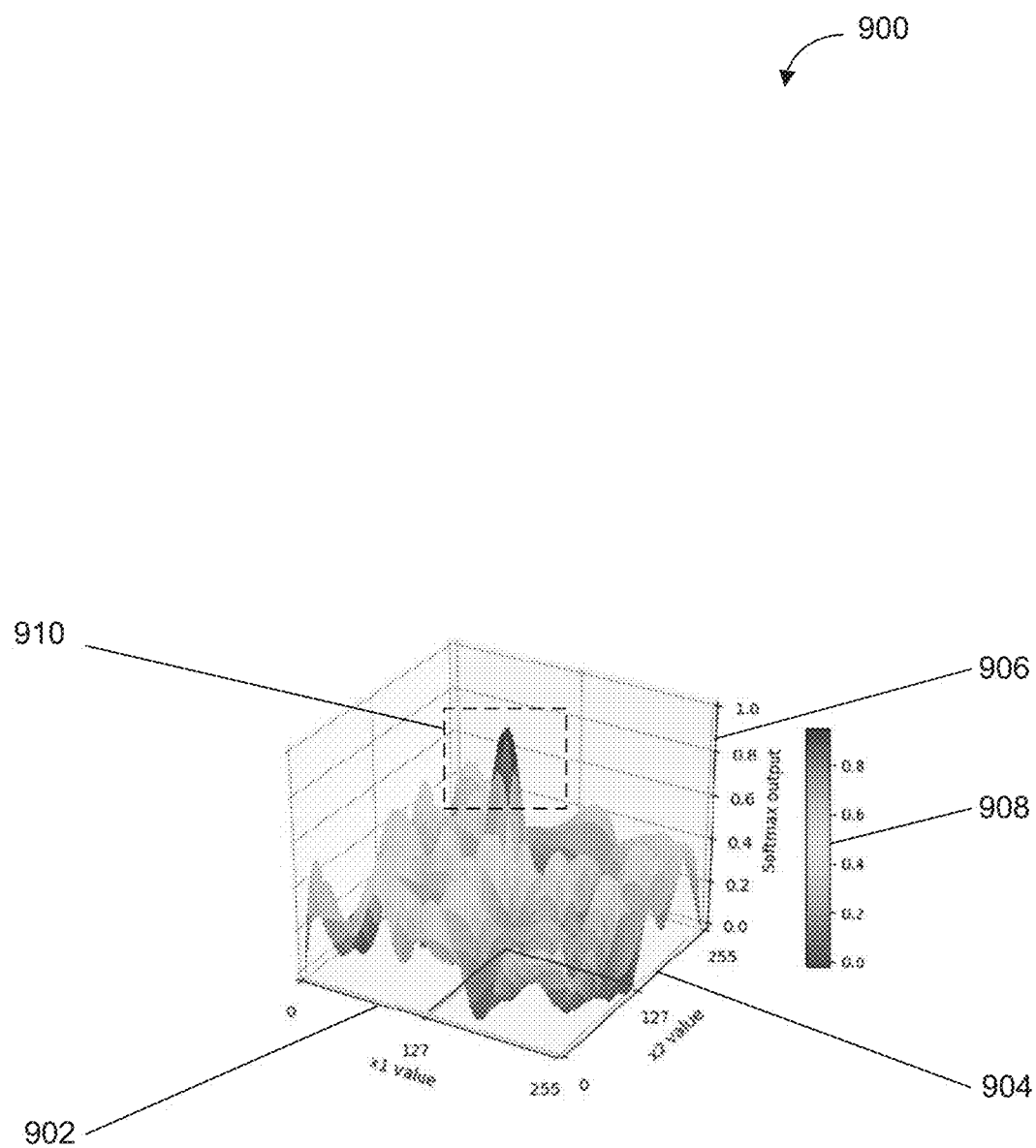
FIG. 9 depicts an example of a visualization of a function of two variables according to example embodiments of the present disclosure.

FIG. 9 depicts an example of a visualization of a function of two variables according to example embodiments of the present disclosure. Any operations and/or actions performed as part of the technique 900 can be performed by a computing device and/or computing system that includes one or more attributes and/or capabilities of the computing device 102, the computing system 130, the training computing system 150, and/or the one or more remote computing systems 170. As shown in FIG. 9, the visualization 900, an $x_1$ axis 902, an $x_2$ axis 904, a softmax output axis 906, a visualization index 908, and a peak 910.

Furthermore, FIG. 9 depicts a function of two variables $x_1$ and $x_2$. The function can be used to test whether a saliency method satisfies Perturbation-E axiom. Applying the Integrated Gradients method on this function, can be used to show that Integrated Gradients does not satisfy Perturbation-E axiom. In this example, the visualization 900 is a three-dimensional depiction of function value. The function value depends on values of $x_1$ associated with the $x_1$ axis 902; and values of $x_2$ associated with $x_2$ axis 904. The visualization index 908 can be used as a reference to determine softmax output which can be measured along the softmax output axis 906.

In this example, the function peaks at the peak 910 (127, 127) and any change (including small changes) in $x_1$ or $x_2$ will significantly drop the classification score. Further, any point on the grid except for (127, 127) is less than 0.5, flipping the prediction to negative. For a saliency technique to satisfy Perturbation-E for an E approximately equal to 0, the saliency technique needs to attribute a small non-zero value to both $x_1$ and $x_2$ for all functions of the form defined in the attribution equation. The sanity check can be performed by sampling many of these functions and testing the saliency technique for each run. Further, the saliency technique fails the test if there are some instances of this function where the attribution of one or both of the input features is zero (or E close to zero from the axiom).

Furthermore, the visualization 900 can be used as part of performing a sanity check to test the validity of a saliency technique. Further, the sanity check can include the use of a validity axiom expressed as: Perturbation-E: Given E, for every feature $x_1$ in an input $x=[x_1, \ldots, x_N]$ where all features except for $x_1$ are fixed, if the removal (setting $x_1=0$) of feature $x_1$ causes the output to change by $\Delta y$, then Perturbation-E is satisfied if the inequality $abs(attr(x_1)) \geq abs(E*\Delta y)$ is satisfied.

A sensitivity axiom can indicate that a saliency technique satisfies the sensitivity axiom if for every input and baseline that differ in one feature but have different predictions then the differing feature should be given a non-zero attribution. The right and left sides of the inequality are equal to each other for E=1 when the sensitivity axiom is satisfied. Further, even when the sensitivity axiom is not satisfied, the validity axiom should be satisfied for a large enough $0<E \leq 1$ since this implies that the features that change the output after removal should have non-zero attributions.

Figure 10A:
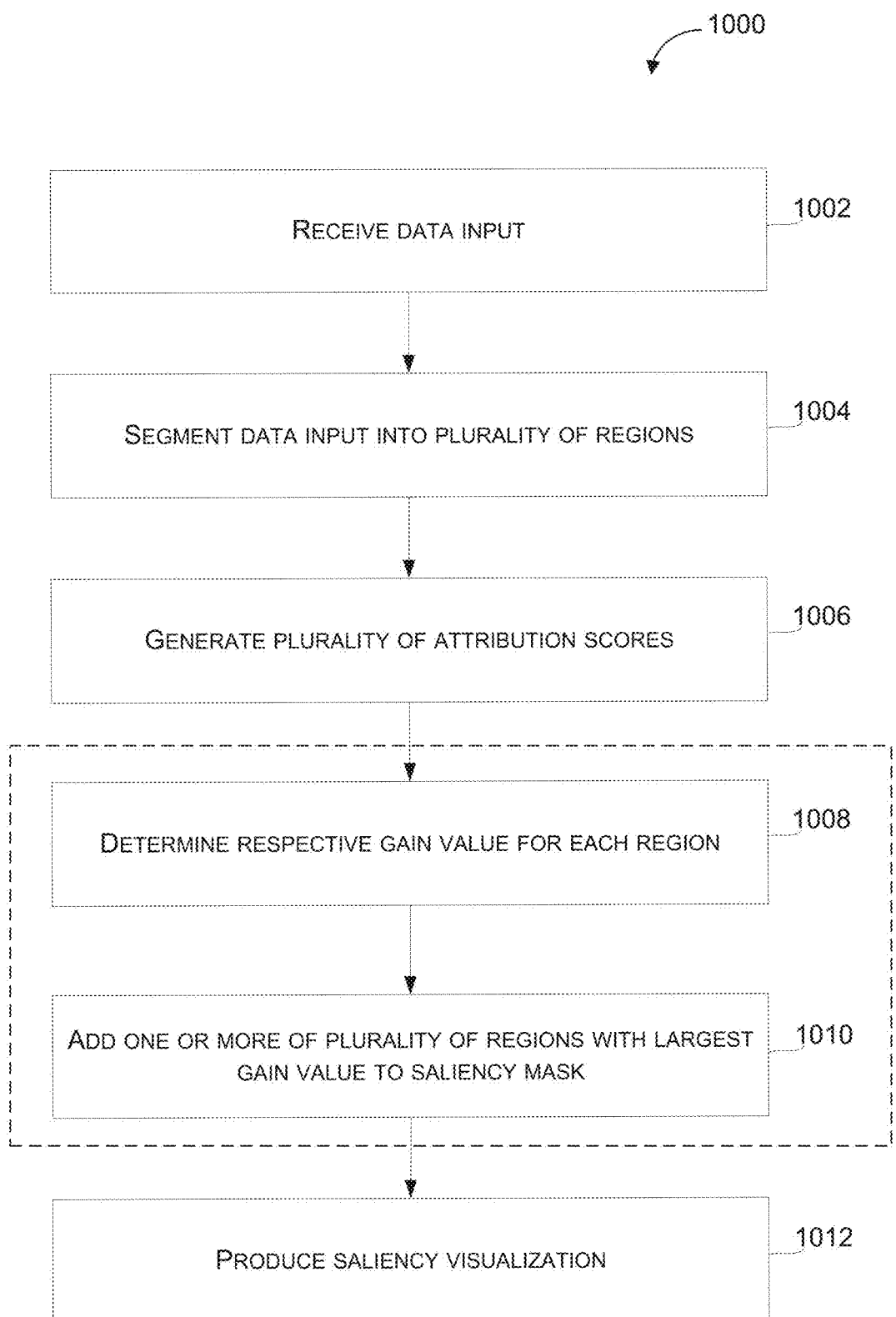
FIG. 10A depicts a flow diagram of a method for performing a saliency technique according to example embodiments of the present disclosure.

FIG. 10A depicts a flow diagram of a method for performing a saliency technique according to example embodiments of the present disclosure. One or more portions of the method 1000 can be executed and/or implemented on one or more computing devices or computing systems including, for example, the computing device 102, the computing system 130, the training computing system 150, and/or the remote computing system 170. Further, one or more portions of the method 1000 can be executed or implemented as an algorithm on the hardware devices or systems disclosed herein. FIG. 10A depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include receiving a data input. The data input can include a plurality of features. In some embodiments, the data input can include an image that can, for example, be encoded in a raster (e.g., bitmap), voxel, or vector image format. Further, the data input can include an image that can include a plurality of points (e.g., a plurality of pixels). For example, the computing system 130 can receive, obtain, and/or retrieve a data input which can include an image.

At 1004, the method 1000 can include segmenting the data input. The data input can be segmented into a plurality of regions. At least one of the plurality of regions can include two or more of the plurality of features. For example, the computing system 130 can perform one or more operations to segment the data input into the plurality of regions. Further, one or more operations performed by the computing system 30 can include use of one or more graph-based techniques.

In some embodiments, segmenting the data input can include segmenting the data input over a plurality of iterations. Further each iteration of segmenting the data input can use a different sets of parameters. By way of example, the sets of parameters can include a scale parameter within the set [50, 100, 150, 250, 500, 1200] that is associated with the size of segments and that will ignore segments that are smaller than 20 pixels. For a single parameter, the union of segments can yield the entire image. As such, the union of all segments can result in an area that is multiple times greater than the data input area, with the result being that individual segments overlap. Furthermore, the segment masks can be dilated by a predetermined amount (e.g., 5 pixels) to obtain the plurality of segments. In other embodiments, the sets of parameters can be associated with other aspects of segments including the shape of the segments and/or a number of segments.

At 1006, the method 1000 can include generating a plurality of attribution scores. In some embodiments, the plurality of attribution scores can be associated with the plurality of regions and/or the plurality of features. Furthermore, the plurality of attribution scores can be respectively generated for the plurality of features of the data input. The attribution scores for each feature can be indicative of a respective saliency of that feature. In some embodiments, each of the plurality of attribution scores can be based at least in part on the use of Integrated Gradients technique that includes the use of black and white baselines.

By using black and white baselines, the sum of the weight term for any pixel in the data input (e.g., an image) will be 1.0 since $|x-1.0|+|x-0.0|=1.0 \forall x \in [0.0, 1.0]$, in which x is the input pixel value and 1.0 and 0.0 correspond to black and white baselines respectively. As such, all of the pixels in the date input have an equal opportunity to contribute to the plurality of attribution scores irrespective of the distance from the baselines. An additional benefit is that the use of Integrated Gradients with black and white baselines can result in the generation of consistent saliency maps. By way of example, the computing system 130 can perform one or more operations including using the Integrated Gradients attribution technique to determine the plurality of attribution scores including the respective attribution score for each pixel of a plurality of pixels in the data input.

1008-1010 of the method 1000 can be performed over a plurality of iterations. For example, a single iteration can include the performance of the operations of 1008 and 1010. Further, after completing performance of a single iteration of the operations of 1008 and 1010, one or more further iterations including the operations of 1008 and 1010 can be performed.

At 1008, the method 1000 can include determining a respective gain value for each region of the plurality of regions. Further, each respective gain value can be based at least in part on the respective attribution scores associated with the features included in the region. Determination of the gain values can be based at least in part on evaluation, for each region of the plurality of regions, of the following gain function: gain:

$$g_s = \sum_{i \in s \setminus M} \frac{A_i}{\text{area}(s \setminus M)}$$

in which the gain value gain: $g_s$ for a region is based at least in part on the saliency mask M; and the attribution map A. For example, the computing system 130 can perform one or more operations including evaluating each region of the plurality of regions using the gain function, and thereby determine the respective gain value for each region of the plurality of regions. Both $s \setminus M$ and $s \cup M$ are possible as gain functions.

At 1010, the method 1000 can include adding one or more of the plurality of regions with the greatest gain values to a saliency mask. In some embodiments, the greatest gain values of the plurality of regions can be based at least in part on the equation $\hat{s} = \arg\max_2 g_s$ in which $\hat{s}$ is the greatest gain value associated with a region. Further, adding the greatest gain values to the saliency mask can be based at least in part on the union of the saliency mask and $\hat{s}$.

For example, the computing system 130 can perform one or more operations including ranking the plurality of regions based at least in part on the respective gain values of the plurality of regions. The computing system 130 can then add the plurality of regions associated with the respective gain values by first adding the region that is associated with the highest ranked gain value then adding each of the plurality of regions associated with the next greatest gain values until some threshold number of regions is added (e.g., the region with the greatest gain value is added first, then the region with the second greatest gain value, then the region with the third greatest gain value, and so on, until the threshold number of regions is reached). The threshold can be any number (e.g., 1).

In some implementations, at 1010 the method can also include, after adding the one or more regions with the greatest gain values to the saliency mask, removing the one or more regions with the greatest gain values from the plurality of regions. As indicated above, in some implementations, after 1010 the method can return to 1008. Alternatively, in some implementations, after 1010 the method can return to 1006 and again recompute plurality of attribution scores. For example, the attribution scores can be recomputed after removing any portions that were added to the saliency mask. Further, once one or more criteria have been met (e.g., the saliency mask covers the whole image), after 1010 the method can proceed to 1012.

At 1012, the method 1000 can include producing and/or generating a saliency visualization. The saliency visualization can be based at least in part on the saliency mask. The saliency visualization can include a visual representation of the salient regions associated with the data input. For example, the computing system can generate a saliency visualization in which some threshold area of the data input that includes the top five percent of salient regions is visible and the remaining portions of the data input are not visible. In some embodiments, the saliency visualization can include an indication of the size of the threshold area that shows the salient portions of the data input.

FIG. 10B depicts an example algorithm for region-based saliency, which is referred to as XRAI.

Figure 11:
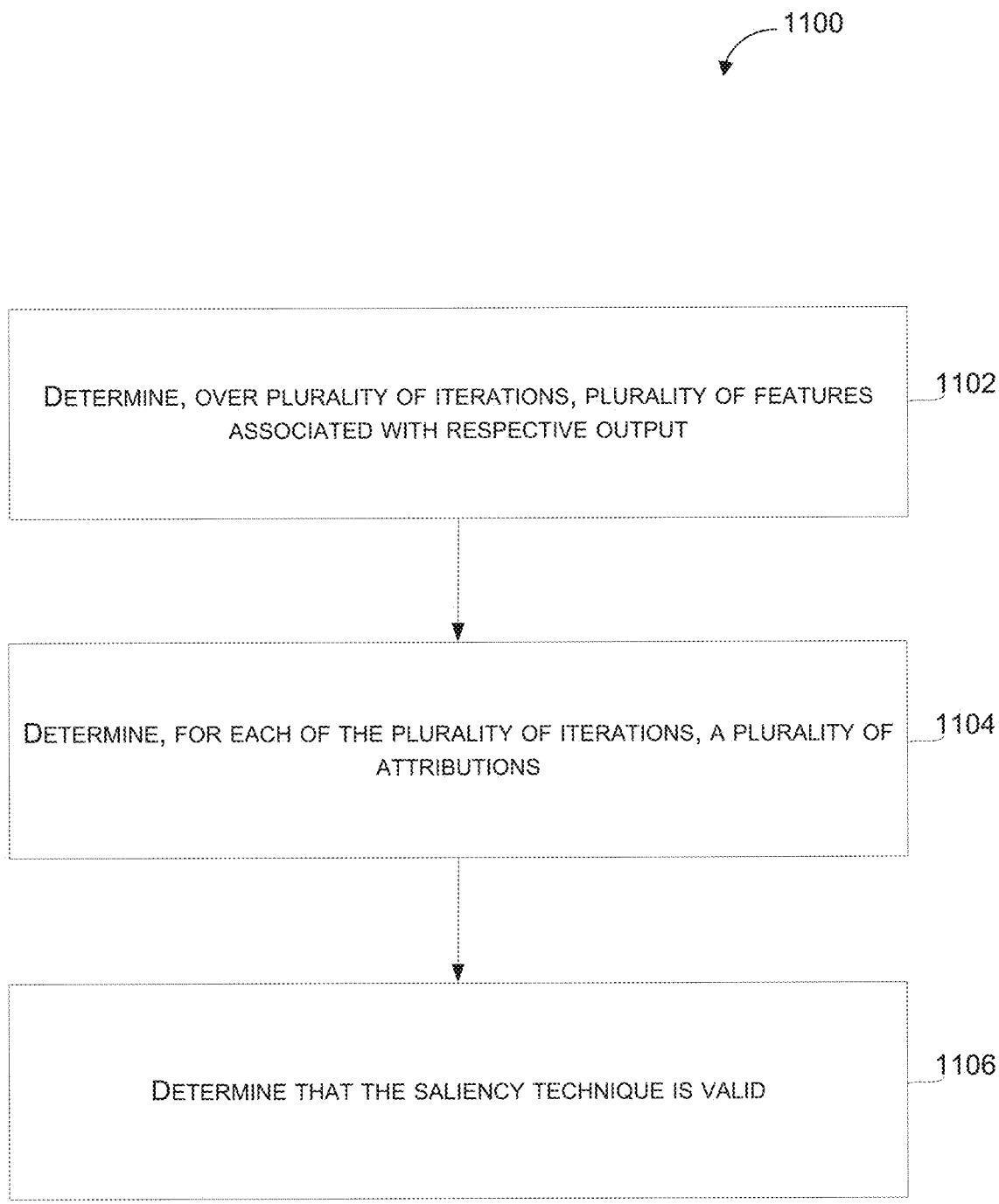
FIG. 11 depicts a flow diagram of a method for validating saliency techniques according to example embodiments of the present disclosure.

FIG. 11 depicts a flow diagram of a method for validating saliency techniques according to example embodiments of the present disclosure. One or more portions of the method 1100 can be executed and/or implemented on one or more computing devices or computing systems including, for example, the computing device 102, the computing system 130, the training computing system 150, and/or the remote computing system 170. Further, one or more portions of the method 1100 can be executed or implemented as an algorithm on the hardware devices or systems disclosed herein. FIG. 11 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include determining, over a plurality of iterations, a plurality of features associated with a respective output. The plurality of features can be based at least in part on an input provided to a machine-learned model that generates the respective output. The one or more different portions of the plurality of features can be masked at each of the plurality of iterations. For example, the computing system 130 can receive an input (e.g., an image) that includes a plurality of points (e.g., a plurality of pixels). Further, at each iteration of the plurality of iterations, different portions of the plurality of points of the input can be masked (e.g., a progressively larger portion of the input can be masked over the plurality of iterations). The machine-learned model can be configured and/or trained to perform classification of an input including generating an output including the classification of the input (e.g., classifying an image as including a depiction of some class of object).

At 1104, the method 1100 can include determining, for each of the plurality of iterations, a plurality of attributions associated with each of the plurality of features respectively. The plurality of attributions can be determined based at least in part on a saliency technique. The plurality of attributions can be associated with an importance of each of the plurality of features in contributing to the output. For example, the computing system 130 can, at each of the plurality of iterations, perform a saliency technique (e.g., Integrated Gradients using black and white baselines) on the input to determine a plurality of attributions associated with each of the plurality of features of the input. As different portions of the plurality of features are masked at each of the plurality of iterations, the plurality of attributions associated with each of the plurality of features can be different for the different iterations of the plurality of iterations.

At 1106, the method 1100 can include determining that the saliency technique is valid when the plurality of features that cause non-zero change in the respective output are associated with a non-zero attribution. For example, the input can be an image of a cat in the living room of a house in which the cat occupies fifteen percent (15%) of the area of the image. Further, the machine-learned model (e.g., the machine-learned model 140 implemented by the computing system 130) can be configured and/or trained to recognize cats. The plurality of features associated with the cat (e.g., the pixels of the image including the cat) including, for example, the plurality of features associated with the cat's face, should result in a non-zero change in the output since those features are salient and should be reflected in the machine-learned model's output.

Figure 12:
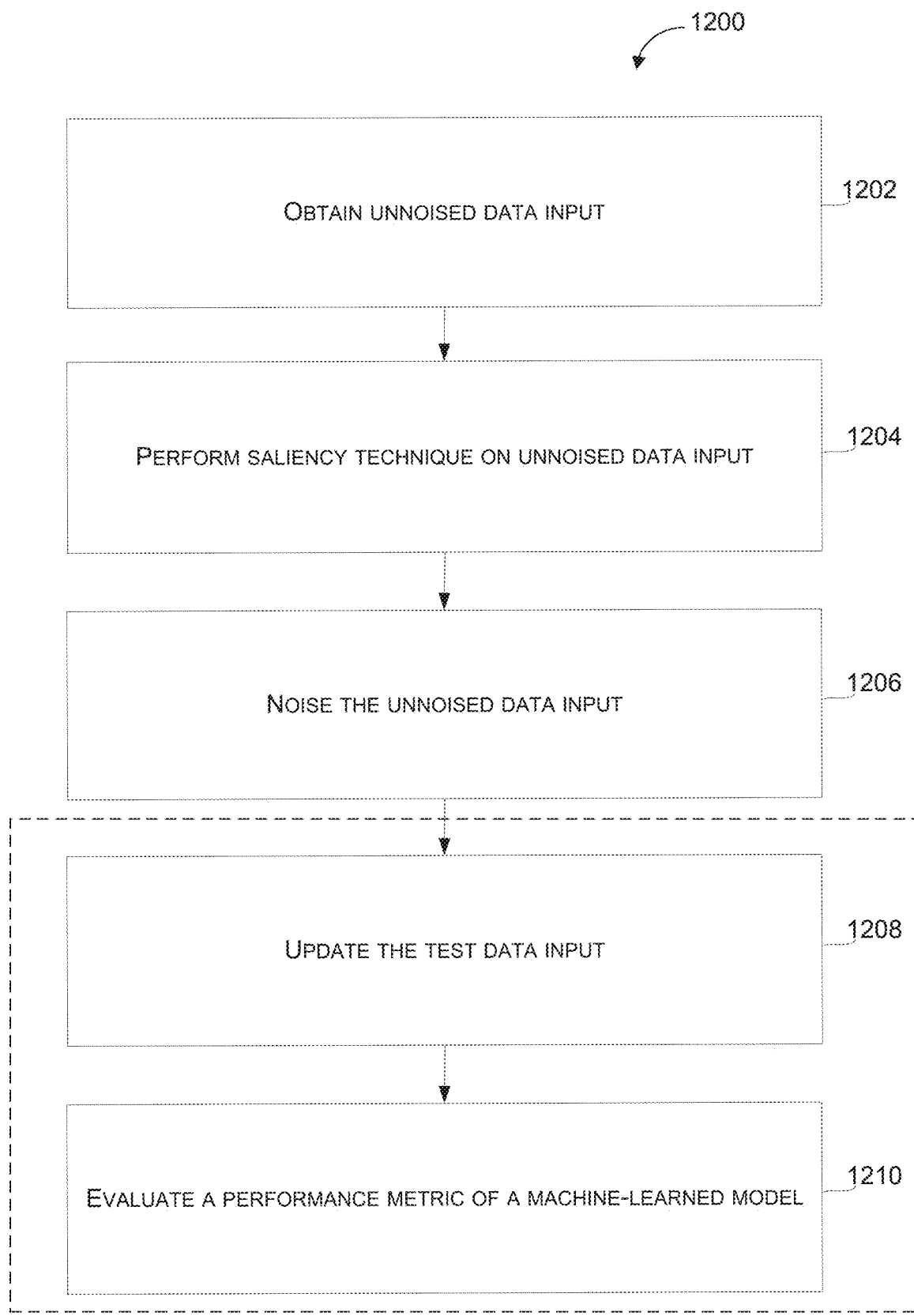
FIG. 12 depicts a flow diagram of a method for evaluating machine-learned model performance according to example embodiments of the present disclosure.

FIG. 12 depicts a flow diagram of a method for evaluating machine-learned model performance according to example embodiments of the present disclosure. One or more portions of the method 1200 can be executed and/or implemented on one or more computing devices or computing systems including, for example, the computing device 102, the computing system 130, the training computing system 150, and/or the remote computing system 170. Further, one or more portions of the method 1200 can be executed or implemented as an algorithm on the hardware devices or systems disclosed herein. FIG. 12 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include obtaining an unnoised data input. An unnoised data input can include an image that does not include any added noise (e.g., noise that has been added in order to obfuscate and/or distort one or more portions of the image) and/or an image that has not been blurred. By way of example, the computing system 130 can receive, obtain, and/or retrieve the unnoised data input which can include an image that is free from noise that was added after the image was captured.

At 1204, the method 1200 can include performing the saliency technique on the unnoised data input to determine a respective salience score for each of a plurality of portions of the unnoised data input. For example, the computing system 130 can perform an Integrated Gradients saliency technique on the unnoised data input in order to determine a respective salience score for each of a plurality of points (e.g., plurality of pixels) of the unnoised data input.

At 1206, the method 1200 can include noising the unnoised data input to obtain an initial version of a test data input. For example, the computing system 130 can perform one or more operations to generate a test data input by adding noise to the data input. Generating the test data input can include the computing system 130 blurring the image. In some embodiments, noising the data input can include blurring (e.g., using a Gaussian function to blur an image) the data input and/or adding random noise to the data input (e.g., a random pattern of black speckles added to an image).

1208 and 1210 can be performed over a plurality of iterations. For example, a single iteration can include the performance of the operations 1208 and 1210. Further, after completing performance of a single iteration including the operations of 1208 and 1210, one or more further iterations including further operations of 1208 and 1210 can be performed.

At 1208, the method 1200 can include updating the test data input by inserting into the test data input the portion of the unnoised data input that has the highest salience score, and which has not yet been inserted into the test data input. For example, the unnoised data input can include an image of a dog that is free from noise. Further, a portion of the image of the dog (e.g., the dog's eye) can be inserted into the corresponding location in the test data input that is a noised (e.g., blurred) version of the unnoised data input (the image of the dog that is free from noise). At each of a plurality of iterations another portion of the unnoised image of the dog including any previously added portions of the unnoised image of the dog can be added to the test data input.

At 1210, the method 1200 can include evaluating a performance metric of a machine-learned model on the test data input. For example, the one or more machine-learned models 140 implemented on the computing system 130 can be configured and/or trained to determine the salient portions of the test data input. Further, the one or more machine-learned models 140 can be evaluated based at least in part on the accuracy with which the one or more machine-learned models 140 correctly identified the salient portions of the test data input. Greater accuracy of the one or more machine-learned models 140 in correctly identifying the salient portions of the test data input can be positively correlated with better performance as measured by the performance metric.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of attribution, the computer-implemented method comprising: receiving, by a computing system comprising one or more processors, a data input comprising a plurality of features; segmenting, by the computing system, the data input into a plurality of regions, wherein at least one of the plurality of regions comprises two or more of the plurality of features; generating, by the computing system, a plurality of attribution scores respectively for the plurality of features of the data input based on an integrated gradients density of the plurality of regions, wherein the integrated gradients density for each region of the plurality of regions is determined at least in part based on differences in features in each region with a plurality of different baselines, and the attribution scores for each feature are indicative of a respective saliency of such feature; for each of one or more iterations: determining, by the computing system, a respective gain value for each region based at least in part on the respective attribution scores associated with the features included in each region; and adding, by the computing system, one or more of the plurality of regions with the greatest gain values to a saliency mask; and producing, by the computing system, a saliency visualization based at least in part on the saliency mask.

2. The computer-implemented method of claim 1, wherein the data input comprises an image and the plurality of features of the data input comprise a plurality of pixels of the image.

3. The computer-implemented method of claim 1, wherein the plurality of regions comprises a plurality of overlapping regions.

4. The computer-implemented method of claim 1, wherein the segmenting the data input into the plurality of regions comprises: performing, by the computing system, a plurality of iterations of a segmentation technique on the data input respectively with a plurality of different segmentation parameter values.

5. The computer-implemented method of claim 1, wherein the one or more iterations comprise a plurality of iterations.

6. The computer-implemented method of claim 5, wherein each of the plurality of iterations further comprises: after adding the one or more regions with the greatest gain values to the saliency mask, removing the one or more regions with the greatest gain values from the plurality of regions.

7. The computer-implemented method of claim 1, wherein the determining, by the computing system, the respective gain value for each region comprises: determining, by the computing system, a respective gain in total attributions per area associated with each region.

8. The computer-implemented method of claim 1, wherein the determining, by the computing system, the respective gain value for each region comprises: determining, by the computing system, for each region, a sum for all features included in each region respectively, but not the saliency mask, of the respective attribution value divided by an area of the region not included in the saliency mask.

9. The computer-implemented method of claim 1, wherein the producing the saliency visualization comprises: producing, by the computing system, the saliency visualization based at least in part on an order in which the regions included in the saliency mask were added to the saliency mask.

10. The computer-implemented method of claim 9, wherein the producing the saliency visualization based at least in part on the order in which the regions included in the saliency mask were added to the saliency mask comprises: adding, iteratively and according to the order in which the regions included in the saliency mask were added to the saliency mask, regions to a visualization group until a threshold percentage of the data input is included within the visualization group; and producing the saliency visualization in which the features included within regions included in the visualization group are visually distinct from a remainder of the data input.

11. The computer-implemented method of claim 9, wherein the producing, by the computing system, the saliency visualization based at least in part on the order in which the regions included in the saliency mask were added to the saliency mask comprises: providing, by the computing system, a heat map visualization that visually indicates the order in which the regions included in the saliency mask were added to the saliency mask.

12. The computer-implemented method of claim 1, wherein the plurality of regions comprises a variety of different shapes.

13. The computer-implemented method of claim 1, wherein the data input comprises an image and the plurality of features of the data input comprise a plurality of pixels of the image, and the integrated gradients density for each region of the plurality of regions is determined at least in part based on accumulating gradients of the image based in part on differences between pixels in each region with the plurality of different baselines.

14. The computer-implemented method of claim 1, wherein the plurality of different baselines comprises at least one white baseline and at least one black baseline.

* * * * *